United States Patent
Yang et al.

(10) Patent No.: US 9,350,575 B2
(45) Date of Patent: May 24, 2016

(54) METHOD AND APPARATUS FOR TRANSMITTING UPLINK CONTROL SIGNALING AND BEARING UPLINK DEMODULATION REFERENCE SIGNAL

(75) Inventors: Weiwei Yang, Shenzhen (CN); Chunli Liang, Shenzhen (CN); Bo Dai, Shenzhen (CN); Bin Yu, Shenzhen (CN); Peng Zhu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 798 days.

(21) Appl. No.: 13/581,320

(22) PCT Filed: Nov. 24, 2010

(86) PCT No.: PCT/CN2010/079084
§ 371 (c)(1),
(2), (4) Date: Aug. 27, 2012

(87) PCT Pub. No.: WO2012/019398
PCT Pub. Date: Feb. 16, 2012

(65) Prior Publication Data
US 2012/0320872 A1 Dec. 20, 2012

(30) Foreign Application Priority Data

Aug. 12, 2010 (CN) .......................... 2010 1 0255033

(51) Int. Cl.
*H04W 4/00* (2009.01)
*H04L 25/03* (2006.01)
(Continued)

(52) U.S. Cl.
CPC ........ *H04L 25/03898* (2013.01); *H04L 5/0048* (2013.01); *H04L 5/0053* (2013.01); *H04L 27/2602* (2013.01); *H04L 27/2636* (2013.01); *H04L 5/0007* (2013.01)

(58) Field of Classification Search
None
See application file for complete search history.

(56) References Cited

U.S. PATENT DOCUMENTS 7,986,743 B2 * 7/2011 Ho et al. .................. 375/267
9,100,954 B2 * 8/2015 Jang et al.
(Continued)

FOREIGN PATENT DOCUMENTS

| CN | 101132387 A | 2/2008 |
| CN | 101286970 A | 10/2008 |

(Continued)

OTHER PUBLICATIONS

3GPP TSG-RAN WG1 #50, Multiplexing of Sounding RS and PUCCH, ZTE, Athens, Greece, Aug. 20, 2007.
(Continued)

*Primary Examiner* — Michael J Moore, Jr.
(74) *Attorney, Agent, or Firm* — Oppedahl Patent Law Firm LLC

(57) ABSTRACT

The disclosure provides a method for transmitting uplink control signaling, which includes: respectively performing, on the uplink control signaling, channel coding, scrambling, modulation, time-domain spreading and precoding transform; or respectively performing, on the uplink control signaling, channel coding, scrambling, modulation, precoding transform and time-domain spreading; and mapping the uplink control signaling to an Orthogonal Frequency Division Multiplexing (OFDM) symbol used for bearing the uplink control signaling; and transmitting the uplink control signaling that is borne in the OFDM symbol. The disclosure also provides a method for bearing a demodulation reference signal during transmission of uplink control signaling, which includes: bearing the uplink demodulation reference signal in k OFDM symbols in a sub-frame. The disclosure also discloses apparatuses for respectively implementing the methods above. The technical solutions of the disclosure effectively solve the problem that the uplink control signaling is transmitted using a structure of Discrete Fourier Transform-spread-OFDM (DFT-s-OFDM).

24 Claims, 16 Drawing Sheets

(51) Int. Cl.
*H04L 27/26* (2006.01)
*H04L 5/00* (2006.01)

(56) References Cited

U.S. PATENT DOCUMENTS

| | | | | |
|---|---|---|---|---|
| 9,203,584 | B2* | 12/2015 | Ji | H04L 5/0053 |
| 2007/0147228 | A1* | 6/2007 | Kim et al. | 370/208 |
| 2008/0084815 | A1 | 4/2008 | Shin | |
| 2010/0034165 | A1 | 2/2010 | Han et al. | |
| 2010/0135360 | A1* | 6/2010 | Kwak et al. | 375/135 |
| 2010/0331030 | A1* | 12/2010 | Nory | H04L 5/0053 455/509 |
| 2011/0194551 | A1* | 8/2011 | Lee | H04B 7/0626 370/342 |
| 2011/0249647 | A1* | 10/2011 | Chen | H04L 1/1614 370/330 |

FOREIGN PATENT DOCUMENTS

| | | |
|---|---|---|
| CN | 101296021 A | 10/2008 |
| CN | 101505293 A | 8/2009 |
| JP | 2009302880 A | 12/2009 |
| RU | 2290764 C2 | 12/2006 |
| WO | 2010064852 A2 | 6/2010 |
| WO | 2010068047 A2 | 6/2010 |

OTHER PUBLICATIONS

3GPP TSG-RAN WG1 #51bis, Embedded Coding for PUCCH Transmissions of CQI+ACK/NACK, Sharp, Sevilla, Spain, Jan. 14, 2008.
Ericsson, ST-Ericsson, "Evaluation of PUCCH Proposals for Carrier Aggregation", 3GPP TSG-RAN WG1 #60bis, R1-101731, Apr. 12, 2010. (9 pages—see entire document).
Qualcomm Incorporated, "Transmit Diversity for PUCCH Format 2/2a/2b", 3GPP TSG-RAN WG1 #59bis, R1-100689, Jan. 18, 2010. (10 pages—see entire document).
Ericsson et al: "PUCCH Design for CA", 3GPP Draft; R1-103506, 3rd Generation Partnership Project (3GPP), Mobile Competence Centre; 650, Route Des Lucioles; F-06921 Sophia-Antipolis Cedex ; France, vol. RAN WG1, no. Dresden, Germany; Jun. 22, 2010. (5 pages—See Supplementary European Search Report in European application No. 10855819.8 for relevant pages).
Qualcomm Incorporated: "Link Comparison of Multi-UL-ACK Transmission Schemes in Support of CA", 3GPP Draft; R1-102743 Multiple UL-ACK for CA, 3rd Generation Partnership Project (3GPP), Mobile Competence Centre; 650, Route Des Lucioles ; F-06921 Sophia-Antipolis Cedex ; France, vol. RAN WG1, no. Montreal, Canada; May 4, 2010. (8 pages—See Supplementary European Search Report in European application No. 10855819.8 for relevant pages).
CATT: "UL ACK/NAK transmission for TDD with CA", 3GPP Draft; R1-103469, 3rd Generation Partnership Project (3GPP), Mobile Competence Centre; 650, Route Des Lucioles; F-06921 Sophia-Antipolis Cedex ; France, vol. RAN WG1, no. Dresden, Germany; Jun. 22, 2010. (3 pages—See Supplementary European Search Report in European application No. 10855819.8 for relevant pages).
ZTE: "Details for A/N transmission based on DFT-s-OFDM", 3GPP Draft; R1-104671 Details for an Transmission Based on DFT-S-OFDM, 3rd Generation Partnership Project (3GPP), Mobile Competence Centre; 650, Route Des Lucioles ; F-06921 Sophia-Antipolis Cedex; France, vol. RAN WG1, no. Madrid, Spain; Aug. 17, 2010. (8 pages—See Supplementary European Search Report in European application No. 10855819.8 for relevant pages).
"3rd Generation Partnership Project; Technical Specification Group Radio Access Network; Evolved Universal Terrestrial Radio Access (E-UTRA); Multiplexing and channel coding (Release 9)", 3GPP Standard; 3GPP TS 36.212, 3rd Generation Partnership Project (3GPP), Mobile Competence Centre; 650, Route Des Lucioles ; F-06921 Sophia-Antipolis Cedex ; France, No. V9.2.0, May 31, 2010. (61 pages—See Supplementary European Search Report in European application No. 10855819.8 for relevant pages).
"3rd Generation Partnership Project;Technical Specification Group Radio Access Network;Evolved Universal Terrestrial Radio Access (E-UTRA);Physical Channels and Modulation(Release 9)", 3GPP Draft; DRAFT36211-910, 3rd Generation Partnership Project (3GPP), Mobile Competence Centre; 650, Route Des Lucioles; F-06921 Sophia-Antipolis Cedex; France, vol. RAN WG1, Mar. 22, 2010. (85 pages—See Supplementary European Search Report in European application No. 10855819.8 for relevant pages).
Supplementary European Search Report in European application No. 10855819.8, mailed on Feb. 5, 2014. (11 pages—see entire document).
International Search Report in international application No. PCT/CN2010/079084, mailed on Jun. 2, 2011.
English Translation of the Written Opinion of the International Search Authority in international application No. PCT/CN2010/079084, mailed on Jun. 2, 2011.
Data—non-associated control signal transmission without UL data, mailed on Apr. 3, 2007.
Comparison of ACKINACK Transmission Schemes on PUCCH for CA, mailed on Apr. 12, 2010.
Ericsson et al: "Pucch design lor carrier aggregation", 3GPP Oraft; R1-102611 , 3RO Generation Partnership Project (3GPP), Mobile Competence Centre; 650, Route Oes Lucioles; F-06921 Sophia-Antipolis Ceoex; France, vol. RAN WG1, No. Montreal, Canada; 20100510, May 4, 2010, XP050419830.
Ericsson et al: "Evaluation of PUCCH Proposals for Carrier Aggregation", 3GPP Draft; R1-103507, 3RO Generation Partnership Project (3GPP), Mobile Competence Centre; 650, Route Des Lucioles; F-06921 Sophia-Antipolis Ceoex; France, vol. RAN WG1, No. Dresden, Germany; 20100628, Jun. 22, 2010, XP050449026.

* cited by examiner

METHOD AND APPARATUS FOR TRANSMITTING UPLINK CONTROL SIGNALING AND BEARING UPLINK DEMODULATION REFERENCE SIGNAL

TECHNICAL FIELD

The disclosure relates to a technology of transmitting uplink control signaling, in particular to a method and apparatus for transmitting uplink control signaling in a carrier aggregation system, and a method and apparatus for bearing an uplink demodulation reference signal during transmission of uplink control signaling.

BACKGROUND

In a Hybrid Automatic Repeat Request (HARQ) mode, codes transmitted by a transmitting end are not only able to detect errors, but also have a certain error correcting capability. After receiving codes, a decoder at a receiving end firstly detects errors; when the errors are within the error correcting capability of the codes, the errors are automatically corrected; when there are too many errors, which go beyond the error correcting capability of the codes, and the errors can still be detected, then the receiving end transmits a decision signal to the transmitting end via a feedback channel to ask the transmitting end to retransmit the information. In an Orthogonal Frequency Division Multiplexing (OFDM) system, Acknowledged/Non-Acknowledged (ACK/NACK) control signaling is used to indicate whether transmission is right or wrong, so as to determine whether the information needs to be retransmitted or not.

The Long Term Evolution (LTE) system is an important project of the third generation partnership organization; FIG. 1 shows a schematic diagram illustrating a basic frame structure of the LTE system in the relevant technologies; as shown in FIG. 1, the basic frame structure of the LTE system is illustrated, which includes five hierarchies, namely, radio frame, half-frame, sub-frame, slot and symbol, wherein one radio frame has a length of 10 ms and consists of two half-frames; each half-frame has a length of 5 ms and consists of five sub-frames; each sub-frame has a length of 1 ms and consists of two slots; and each slot has a length of 0.5 ms.

When the LTE system adopts a normal cyclic prefix, one slot includes seven uplink/downlink symbols each having a length of 66.7 µs, wherein the cyclic prefix of the first symbol has a length of 5.21 µs, and the cyclic prefix of the other six symbols has a length of 4.69 µs.

When the LTE system adopts an extended cyclic prefix, one slot includes six uplink/downlink symbols each having a length of 66.7 µs, wherein the cyclic prefix of each symbol has a length of 16.67 µs.

In a downlink HARQ of the LTE system, an Acknowledged/Non-Acknowledged (ACK/NACK) message is transmitted on a Physical Downlink Shared Channel (PDSCH); when a User Equipment (UE) has no Physical Uplink Shared Channel (PUSCH), the ACK/NACK message is transmitted on a Physical Uplink Control Channel (PUCCH); the LTE system defines a plurality of PUCCH formats, including PUCCH format 1/1a/1b and format 2/2a/2b, wherein the format 1 is used to transmit a Scheduling Request (SR) signal of the UE; the format 1a and the format 1b are respectively used to feed back a 1-bit ACK/NACK message and a 2-bit ACK/NACK message; the format 2 is used to transmit Channel States Information (CSI), wherein the CSI includes Channel Quality Information (CQI), Precoding Matrix Indicator (PMI) and Rank Indication (RI); the format 2a is used to transmit the CSI and a 1-bit ACK/NACK message; the format 2b is used to transmit the CSI information and a 2-bit ACK/NACK message; and the format 2a/2b is only applied to the scenario with the cyclic prefix being a normal cyclic prefix.

In the LTE system, in a Frequency Division Duplex (FDD) system, since there is a one-to-one correspondence between uplink sub-frames and downlink sub-frames, the UE needs to feed back a 1-bit ACK/NACK message when the PDSCH contains only one transmission block, and the UE needs to feed back a 2-bit ACK/NACK message when the PDSCH contains two transmission blocks; in a Time Division Duplex (TDD) system, since there is no one-to-one correspondence between uplink sub-frames and downlink sub-frames, the ACK/NACK message corresponding to a plurality of downlink sub-frames needs to be transmitted on the PUCCH channel of one uplink sub-frame, wherein a set of downlink sub-frames corresponding to uplink frames form a bundling window. The methods for transmitting the ACK/NACK message includes a bundling method and a "multiplexing with channel selection" method; wherein the basic principle of the bundling method is to perform a logic "and" operation on the ACK/NACK message of a transmission block corresponding to each downlink sub-frame and needing to be fed back in the uplink sub-frame; when a downlink sub-frame has two transmission blocks, the UE needs to feed back a 2-bit ACK/NACK message; when each sub-frame has only one transmission block, the UE needs to feed back a 1-bit ACK/NACK message; and the basic principle of the "multiplexing with channel selection" method is to indicate different feedback states of the downlink sub-frame needing to be fed back in the uplink sub-frame using different PUCCH channels and different modulation symbols on the PUCCH channel; when the downlink sub-frame has a plurality of transmission blocks, the ACK/NACK fed back by the plurality of transmission blocks of the downlink sub-frame is first subjected to a logic "and" operation (also called spatial bundling), and then is subjected to a channel selection, and finally is transmitted using the PUCCH format 1b.

In the LTE system, there are two types of uplink reference signals: one type is an uplink Demodulation Reference Signal (DM RS), and the other type is an uplink Sounding Reference Signal (SRS); wherein the DM RS is formed by a sequence on the frequency domain and the sequence is a Cyclic Shift (CS) of a reference signal sequence, different PUCCH formats correspond to different DM RS structures; the SRS is periodically transmitted, when both an ACK/NACK message and an SRS are transmitted, the ACK/NACK message is transmitted using a truncation structure, namely, the last symbol of the second slot of each sub-frame is not used to bear the ACK/NACK message; when both a CSI and an SRS are transmitted, only the CSI is transmitted.

In order to meet the requirement of the International Telecommunication Union-Advanced (ITU-Advanced), a Long Term Evolution Advanced (LTE-A) system, as the evolution standard of the LTE system, needs to support a greater system bandwidth (up to 100 MHz) and needs to be backward compatible with the existing standards of the LTE system. On the basis of the existing LTE system, the bandwidth of the LTE system can be merged to obtain a greater bandwidth, which is called a Carrier Aggregation (CA) technology. This CA technology can improve the spectrum utilization rate of an IMT-Advance system and relieve the shortage of spectrum resources, thereby optimizing the utilization of the spectrum resource.

When the LTE-A adopts the CA technology and the UE is configured with four downlink component carriers, the UE needs to feed back the ACK/NACK messages of these four downlink component carriers. In the condition of Multiple Input Multiple Output (MIMO), the UE needs to feed back the ACK/NACK message of each code; therefore, when the UE is configured with four downlink component carriers, the UE needs to feed back eight ACK/NACK messages. At present, the conclusion about the ACK/NACK message feedback is that: for a terminal of the LTE-A system, when 4 bits are supported at most for an ACK/NACK message, the "multiplexing with channel selection" method is adopted; when more than 4 bits are supported for an ACK/NACK message fed back, a method of a Discrete Fourier Transform-spread-OFDM (DFT-s-OFDM) structure is adopted; of course, other uplink control signaling also can be transmitted using the DFT-s-OFDM structure. However, at present, the LTE-A system does not provide a specific method for transmitting the uplink control signaling adopting the structure of DFT-s-OFDM, and does not indicate the location and the number of uplink reference signals in this structure.

SUMMARY

In view of the problems above, the main purpose of the disclosure is to provide a method and apparatus for transmitting uplink control signaling, and a method and apparatus for bearing an uplink demodulation reference signal during transmission of uplink control signaling, to effectively solve the problem that the uplink control signaling is transmitted using a DFT-s-OFDM structure.

In order to achieve the purpose above, the technical solutions of the disclosure are realized as follows.

The disclosure provides a method for transmitting uplink control signaling, which includes:

respectively performing, on the uplink control signaling, channel coding, scrambling, modulation, time-domain spreading and precoding transform; or respectively performing, on the uplink control signaling, channel coding, scrambling, modulation, precoding transform and time-domain spreading; and mapping the uplink control signaling to an Orthogonal Frequency Division Multiplexing (OFDM) symbol used for bearing the uplink control signaling; and transmitting the uplink control signaling that is borne in the OFDM symbol.

Preferably, performing channel coding on the uplink control signaling may include:

when a bit number of the uplink control signaling is greater than 11 bits, performing coding using a tail biting convolution code with constraint length of 7 and code rate of 1/3; and performing coding using a linear block code when the bit number is no greater than 11 bits.

Wherein, a length of the coded uplink control signaling may be related to whether two slots in a sub-frame bear same information, specifically, when two slots in a sub-frame bear the same information, the length of the coded uplink control signaling is 12xQm; and when two slots in a sub-frame bear different information, the length of the coded uplink control signaling is 24xQm, wherein Qm is a corresponding modulation order.

Preferably, performing scrambling on the uplink control signaling may include:

adding a scrambling sequence to a sequence of the coded uplink control signaling, and performing an operation of mod 2 to obtain a scrambled sequence; wherein the scrambling sequence is formed by a pseudorandom sequence.

Preferably, performing modulation on the uplink control signaling may include:

modulating a sequence of the scrambled uplink control signaling by adopting a Quadrature Phase Shift Keying (QPSK) modulation mode.

Preferably, performing time-domain spreading on the uplink control signaling may include:

spreading a sequence of the processed uplink control signaling to an OFDM symbol used for bearing the uplink control signaling using an orthogonal sequence;

wherein the orthogonal sequence may be a Discrete Fourier Transform (DFT) sequence, or a Walsh sequence, or a Const Amplitude Zero Auto Correlation (CAZAC) sequence, or a spreading sequence of the DFT sequence, or a spreading sequence of the Walsh sequence, or a spreading sequence of the CAZAC sequence; and wherein a length of the orthogonal sequence may be equal to a number of OFDM symbols used for bearing the uplink control signaling in one slot.

Preferably, performing precoding transform on the uplink control signaling may include:

performing a DFT operation on a sequence of the uplink control signaling in the OFDM symbol used for bearing the uplink control signaling.

Preferably, the OFDM symbol used for bearing the uplink control signaling may be OFDM symbols in a sub-frame other than an OFDM symbol occupied by an uplink reference signal.

Preferably, the method may further include:

when the uplink control signaling and an uplink Sounding Reference Signal (SRS) are borne in one sub-frame, neither uplink control signaling nor an uplink demodulation reference signal is borne in a last OFDM symbol in a second slot of the sub-frame.

Preferably, the uplink control signaling may be an Acknowledged/Non-Acknowledged (ACK/NACK) message or Channel State Information (CSI) for an uplink feedback.

The disclosure further provides a method for bearing a demodulation reference signal during transmission of uplink control signaling, which includes:

bearing the demodulation reference signal in k Orthogonal Frequency Division Multiplexing (OFDM) symbols in each slot.

Preferably, the method may further include:

in a sub-frame with a normal cyclic prefix, k=2 or k=3; and
in a sub-frame with an extended cyclic prefix, k=2 or k=1.

Preferably, bearing the demodulation reference signal in k OFDM symbols in each slot may include:

in a sub-frame with a normal cyclic prefix, bearing three demodulation reference signals respectively in the following OFDM symbols in each slot:

a second OFDM symbol, a third OFDM symbol and a sixth OFDM symbol; or a zeroth OFDM symbol, a third OFDM symbol and a sixth OFDM symbol; or a first OFDM symbol, a third OFDM symbol and a fifth OFDM symbol;

in the sub-frame with the normal cyclic prefix, bearing two demodulation reference signals respectively in the following OFDM symbols in each slot:

a zeroth OFDM symbol and a fifth OFDM symbol; or
a zeroth OFDM symbol and a sixth OFDM symbol; or
a first OFDM symbol and a fifth OFDM symbol; or
a second OFDM symbol and a third OFDM symbol; or
a second OFDM symbol and a fifth OFDM symbol;

in an sub-frame with an extended cyclic prefix, bearing two demodulation reference signals respectively in the following OFDM symbols in each slot:

a zeroth OFDM symbol and a fifth OFDM symbol; or
a zeroth OFDM symbol and a fourth OFDM symbol; or
a second OFDM symbol and a third OFDM symbol; or
a first OFDM symbol and a fourth OFDM symbol; or
a second OFDM symbol and a fifth OFDM symbol; and in the sub-frame with the extended cyclic prefix, bearing one demodulation reference signal in a second OFDM symbol or a third OFDM symbol in each slot;

wherein the OFDM symbols in each slot are numbered starting from 0.

Preferably, the method may further include:

when two or more OFDM symbols are occupied by the uplink demodulation reference signal, the demodulation reference signal borne in each OFDM symbol is of a same sequence or a sequence subjected to time-domain spreading, wherein the sequence is a Computer-generated-Const Amplitude Zero Auto Correlation (CG-CAZAC).

The disclosure provides an uplink transmitting apparatus for a response message, which includes a preprocessing unit, a mapping unit and a transmitting unit, wherein the preprocessing unit is configured to preprocess uplink control signaling;

the mapping unit is configured to map the preprocessed uplink control signaling to an Orthogonal Frequency Division Multiplexing (OFDM) symbol used for bearing the uplink control signaling; and the transmitting unit is configured to transmit the uplink control signaling.

Preferably, the preprocessing unit may further include a channel coding sub-unit, a scrambling sub-unit, a modulation sub-unit, a time-domain spreading sub-unit and a precoding transform sub-unit, wherein the channel coding sub-unit is configured to perform channel coding on the uplink control signaling;

the scrambling sub-unit is configured to scramble the uplink control signaling subjected to the channel coding;

the modulation sub-unit is configured to modulate the scrambled uplink control signaling;

the time-domain spreading sub-unit is configured to perform time-domain spreading on the modulated uplink control signaling; and the precoding transform sub-unit is configured to perform precoding transform on the uplink control signaling subjected to the time-domain spreading.

Preferably, the precoding transform sub-unit may be further configured to perform precoding transform on the modulated uplink control signaling; and the time-domain spreading sub-unit may be further configured to perform time-domain spreading on the uplink control signaling subjected to the precoding transform.

Preferably, the channel coding sub-unit may be further configured to:

perform coding using a tail biting convolution code with constraint length of 7 and code rate of 1/3, when a bit number of the uplink control signaling is greater than 11 bits; and perform coding using a linear block code when the bit number is no greater than 11 bits;

wherein, a length of the coded uplink control signaling may be related to whether two slots in a sub-frame bear same information, specifically, when two slots in a sub-frame bear same information, the length of the coded uplink control signaling is 12xQm; and when two slots in a sub-frame bear different information, the length of the coded uplink control signaling is 24xQm, wherein Qm is a corresponding modulation order.

Preferably, the scrambling sub-unit may be further configured to add a scrambling sequence to a sequence of the coded uplink control signaling, and then perform an operation of mod 2 to obtain a scrambled sequence, wherein the scrambling sequence is formed by a pseudorandom sequence.

Preferably, the modulation sub-unit may be further configured to modulate the scrambled uplink control signaling by adopting a Quadrature Phase Shift Keying (QPSK) modulation mode.

Preferably, the time-domain spreading sub-unit may be further configured to spread a sequence of the processed uplink control signaling to an OFDM symbol used for bearing the uplink control signaling using an orthogonal sequence;

wherein the orthogonal sequence may be a DFT sequence, or a Walsh sequence, or a CAZAC sequence, or a spreading sequence of the DFT sequence, or a spreading sequence of the Walsh sequence, or a spreading sequence of the CAZAC sequence; and wherein a length of the orthogonal sequence may be equal to a number of OFDM symbols used for bearing the uplink control signaling in one slot.

Preferably, the precoding transform sub-unit may be further configured to perform a DFT operation on a sequence of the uplink control signaling in the OFDM symbol used for bearing the uplink control signaling.

Preferably, the OFDM symbol used for bearing the uplink control signaling may be OFDM symbols in a sub-frame other than an OFDM symbol occupied by an uplink reference signal.

Preferably, the mapping unit may be further configured to:

when the uplink control signaling and an Sounding Reference Signal (SRS) are borne in one sub-frame, bear neither the uplink control signaling nor an uplink demodulation reference signal in a last OFDM symbol in a second slot of the sub-frame.

Preferably, the uplink control signaling may be an Acknowledged/Non-Acknowledged (ACK/NACK) message or Channel State Information (CSI) for an uplink feedback.

The disclosure further provides an apparatus for bearing a demodulation reference signal during transmission of uplink control signaling, which includes:

a bearing unit configured to bear an uplink demodulation reference signal in k OFDM symbols in each slot.

Preferably, in a sub-frame with a normal cyclic prefix, k=2 or k=3; and in a sub-frame with an extended cyclic prefix, k=2 or k=1;

wherein the bearing unit may be further configured to:

in the sub-frame with the normal cyclic prefix, bear three demodulation reference signals respectively in the following OFDM symbols in each slot:

a second OFDM symbol, a third OFDM symbol and a sixth OFDM symbol; or
a zeroth OFDM symbol, a third OFDM symbol and a sixth OFDM symbol; or
a first OFDM symbol, a third OFDM symbol and a fifth OFDM symbol;

in the sub-frame with the normal cyclic prefix, bear two demodulation reference signals respectively in the following OFDM symbols in each slot:

a zeroth OFDM symbol and a fifth OFDM symbol; or
a zeroth OFDM symbol and a sixth OFDM symbol; or
a first OFDM symbol and a fifth OFDM symbol; or
a second OFDM symbol and a third OFDM symbol; or
a second OFDM symbol and a fifth OFDM symbol;

in the sub-frame with the extended cyclic prefix, bear two demodulation reference signals respectively in the following OFDM symbols in each slot:

a zeroth OFDM symbol and a fifth OFDM symbol; or
a zeroth OFDM symbol and a fourth OFDM symbol; or
a second OFDM symbol and a third OFDM symbol; or
a first OFDM symbol and a fourth OFDM symbol; or
a second OFDM symbol and a fifth OFDM symbol; and
in the sub-frame with the extended cyclic prefix, bearing one demodulation reference signal in a second OFDM symbol or a third OFDM symbol in each slot;

wherein the OFDM symbols in each slot are numbered starting from 0.

Preferably, when the two or more OFDM symbols may be occupied by the uplink demodulation reference signal, the demodulation reference signal borne in each OFDM symbol is of a same sequence, or a sequence subjected to time-domain spreading, wherein the sequence may be a Computer-generated-Const Amplitude Zero Auto Correlation (CG-CAZAC) sequence.

In the disclosure, when the uplink control signaling needing to be transmitted is transmitted using the structure of DFT-s-OFDM, by the method for transmitting the uplink control signaling in the disclosure, the uplink control information to be transmitted can be successfully borne in a corresponding OFDM symbol in an uplink sub-frame. The technical solution of the disclosure effectively provides a specific method for transmitting the uplink control signaling using a structure of DFT-s-OFDM and a method for bearing an uplink demodulation reference signal when the uplink control signaling is transmitted using the structure.

DETAILED DESCRIPTION

The implementation of the disclosure is described by taking an ACK/NACK message for example. When the ACK/NACK message required for uplink feedback is of more than four bits in a sub-frame, through a coding mode for the ACK/NACK message provided in the disclosure, the ACK/NACK message to be fed back can be successfully borne in a corresponding OFDM symbol in an uplink sub-frame, so that the uplink feedback is successfully performed.

For a better understanding of the purpose, technical solutions and advantages of the disclosure, embodiments are provided hereinafter to illustrate the disclosure in further detail with reference to the accompanying drawings.

The disclosure mainly transmits an ACK/NACK message using a structure of DFT-s-OFDM; specifically, the ACK/NACK message is preprocessed and then is mapped to N OFDM symbols (the number of OFDM symbols occupied by the ACK/NACK message in a sub-frame) to be transmitted, wherein the value of N is related to the type of a cyclic prefix adopted by the system and the number of OFDM symbols occupied by an uplink reference signal; and the location of the OFDM symbol to which the ACK/NACK message is mapped is related to the location of the uplink reference signal.

In this disclosure, the preprocessing of the ACK/NACK message refers to one of the following two modes:

Mode 1: performing channel coding, scrambling, modulation, time-domain spreading and precoding transform in turn;

Mode 2: performing channel coding, scrambling, modulation, precoding transform and time-domain spreading in turn.

Figure 1:
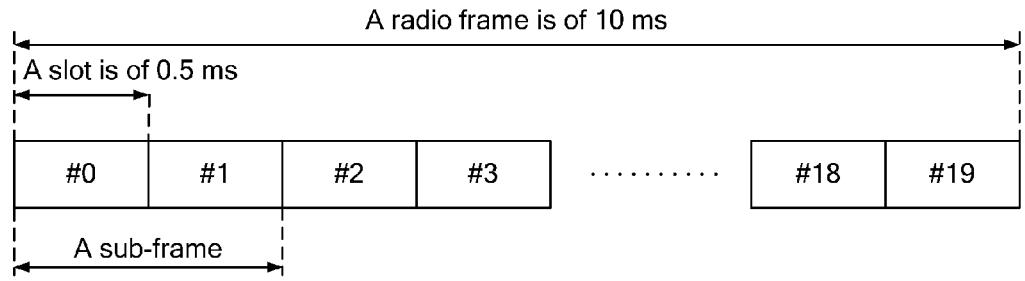
FIG. 1 shows a schematic diagram illustrating a basic frame structure of the LTE system in the relevant technologies.
Figure 2:
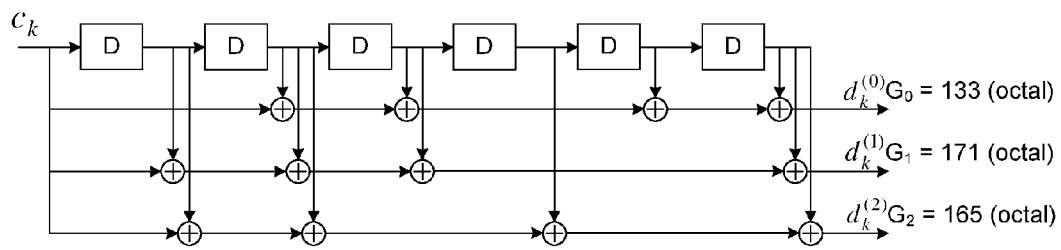
FIG. 2 shows a structural diagram of performing precoding using a tail biting convolution code according to the disclosure.

The process of the channel coding includes: when the bit number M of the ACK/NACK message $O_0, O_1, \ldots O_{M-1}$ needing to be fed back is greater than 11 bits, coding is performed using a tail biting convolution code with constraint length of 7 and code rate of 1/3 as shown in FIG. 2; in FIG. 2, $c_k$ represents a signal to be coded; D represents a modulator; $d_k$ represents a coded signal; and ⊗ represents interleaving processing; what shown in FIG. 2 is only a diagram of the exemplary channel coding; when the bit number M is no greater than 11 bits, coding is performed using a linear block code, wherein the specific coding method of the linear block code is: coding a plurality of feedback messages using a length of a basic sequence specifically includes:

$$b_i = \sum_{n=0}^{O-1} (o_n \cdot M_{mod(i,N),n}) \bmod 2,$$

wherein i=0, 1, 2, ..., B−1; $b_0, b_1, \ldots, b_{B-1}$ represents a bit sequence after the coding; B represents a length after the coding, wherein when two slots bear the same information in a sub-frame, $B=12\times Q_m$; when the two slots bear different information, $B=2\times12\times Q_m$ ($Q_m$ represents a modulation order); N represents the length of the basic sequence; $M_{i,n}$ represents the value of Sequence i in the basic sequence n; $O_0, O_1, \ldots O_{M-1}$ represents the signaling fed back; wherein the basic sequence is as shown in Table 1 or Table 2 below; the basic sequence also can adopt the form of the basic sequence shown in Table 1 or Table 2 subjected to a row permutation, of course, other forms of basic sequences are not excluded.

The process of the scrambling includes: adding a scrambling sequence $c_0, c_1, \ldots c_{B-1}$ to a coded sequence $b_0, b_1, \ldots, b_{B-1}$, and then performing an operation of mod 2 to obtain a scrambled sequence $q_0, q_1, \ldots, q_{B-1}$ namely, $q_i=\mathrm{mod}((c_i+b_i),2)$ ($i=0, 1, \ldots B-1$), wherein the scrambling sequence is formed by a pseudorandom sequence, with an initial value of $c_{init}=(\lfloor n_s/2 \rfloor+1)\cdot(2N_{ID}^{cell}+1)\cdot2^{16}+n_{RNTI}$.

Wherein QPSK is used to perform the modulation and the modulated sequence is

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 0 | 1 | 0 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |

$$Q_0, Q_1, \ldots Q_{\frac{B}{Q_m}-1}(Q_m = 2).$$

Wherein the time-domain spreading refers to spreading the coded sequence to an OFDM symbol occupied by the ACK/NACK message in a sub-frame using an orthogonal sequence, wherein the orthogonal sequence may be a DFT sequence, or a Walsh sequence, or a CAZAC sequence, or a spreading sequence of the DFT sequence, or a spreading sequence of the Walsh sequence or a spreading sequence of the CAZAC sequence; the length of the orthogonal sequence is equal to the number of OFDM symbols occupied by the ACK/NACK message in a slot. When the length of the orthogonal sequence is less than the number of OFDM symbols occupied by the ACK/NACK message, any one or more sequences in the orthogonal sequences can be combined with an original sequence so that the length of the combined sequence is equal to the number of OFDM symbols occupied by the ACK/NACK message.

Wherein the precoding transform refers to performing a DFT operation on the modulated sequence in the OFDM symbol.

The value of N being related to the type of the cyclic prefix adopted by the system and the number of OFDM symbols occupied by an uplink reference signal (DM RS and SRS) refers that: the number of OFDM symbols in a current slot can be obtained according to the type of the cyclic prefix adopted by the system; and the number of OFDM symbols occupied by the ACK/NACK message in a slot can be obtained by subtracting the number of OFDM symbols occupied by the uplink reference signal in the slot from the number of OFDM symbols in the current slot; thus the number N of OFDM symbols occupied by the ACK/NACK message in a sub-frame can be obtained.

The number of OFDM symbols occupied by the uplink demodulation reference signal is 3 or 2 or 1 in a slot; and the number of OFDM symbols occupied by the uplink SRS is 1.

The location of the OFDM symbol to which the ACK/NACK message is mapped being related to the location of the uplink reference signal refers that: the preprocessed ACK/NACK message is mapped to OFDM symbols other than the OFDM symbol occupied by the uplink reference signal.

For a normal cyclic prefix, the number of OFDM symbols occupied by the uplink demodulation reference signal is 3 or 2 in each slot;

wherein when the number of OFDM symbols occupied by the uplink demodulation reference signal is 3, the 3 demodulation reference signals are borne respectively in the following OFDM symbols in each slot: a second OFDM symbol, a third OFDM symbol and a sixth OFDM symbol; or a zeroth OFDM symbol, a third OFDM symbol and a sixth OFDM symbol; or a first OFDM symbol, a third OFDM symbol and a fifth OFDM symbol; wherein the demodulation reference signals in the three OFDM symbols may be of the same sequence, or may be a sequence subjected to time-domain spreading;

wherein when the number of OFDM symbols occupied by the uplink demodulation reference signal is 2, the 2 demodulation reference signals are borne respectively in the following OFDM symbols in each slot: a zeroth OFDM symbol and a fifth OFDM symbol; or a zeroth OFDM symbol and a sixth OFDM symbol; or a first OFDM symbol and a fifth OFDM symbol; or a second OFDM symbol and a third OFDM symbol; or a second OFDM symbol and a fifth OFDM symbol; wherein the demodulation reference signals in the two OFDM symbols may be of the same sequence, or may be a sequence subjected to time-domain spreading.

For an extended cyclic prefix, the number of OFDM symbols occupied by the uplink demodulation reference signal is 2 or 1 in each slot;

wherein when the number of OFDM symbols occupied by the uplink demodulation reference signal is 2, the 2 demodulation reference signals are borne respectively in the following OFDM symbols in each slot: a zeroth OFDM symbol and a fifth OFDM symbol; or a zeroth OFDM symbol and a fourth OFDM symbol; or a second OFDM symbol and a third OFDM symbol; or a first OFDM symbol and a fourth OFDM symbol; or a second OFDM symbol and a fifth OFDM symbol; wherein the demodulation reference signals in the two OFDM symbols may be of the same sequence, or may be a sequence subjected to time-domain spreading;

wherein when the number of OFDM symbols occupied by the uplink demodulation reference signal is 1, the 1 demodulation reference signal may be borne in a second OFDM symbol or a third OFDM symbol in each slot;

wherein the OFDM symbols in each slot are numbered starting from 0.

The sequence used by the demodulation reference signal above is a CG-CAZAC sequence.

When an uplink SRS needs to be transmitted simultaneously, neither the ACK/NACK message nor the demodulation reference signal is borne in the last OFDM symbol in the second slot of each sub-frame.

The essence of the technical solutions of the disclosure is illustrated below in further detail in conjunction with embodiments, wherein in Embodiments 1 to 12, except that the Embodiment 2 describes the condition of one uplink demodulation reference signal existing in each slot, the other embodiments describe the condition of two uplink demodulation reference signals existing in each slot. Embodiments 13 to 16 describe the condition of three demodulation reference signals existing in each slot. FIG. 3 to FIG. 18 are only the exemplary description for the preprocessing of the ACK/NACK message. In the embodiments, OFDM symbols are numbered starting from 0.

Embodiment 1

Figure 3:
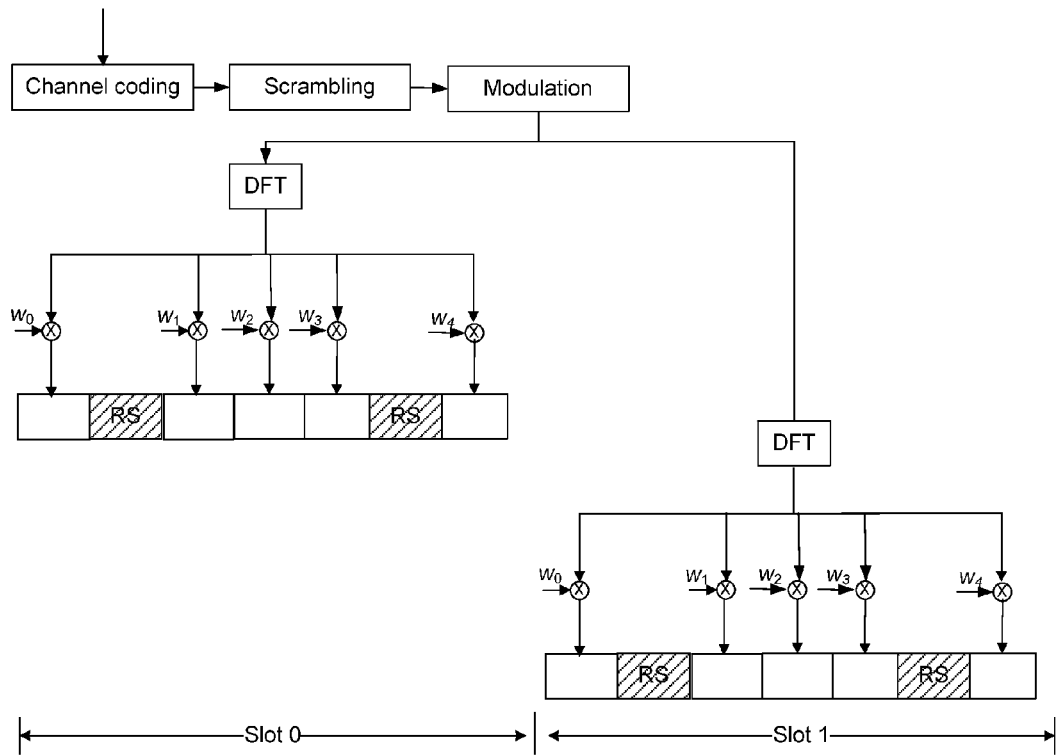
FIG. 3 shows a schematic diagram of preprocessing according to an Embodiment 1 of the disclosure.

Supposing an ACK/NACK message needing to be transmitted is $O_0, O_1, \ldots O_7$; the system adopts a normal cyclic prefix; no SRS needs to be transmitted; the number of OFDM symbols occupied by a DM RS is 2; the DM RS is distributed in the first and fifth OFDM symbols of each slot in a discontinuous manner and the sequence of the DM RS is $r_{u,v}^{\alpha}(n)$ (n=0, 1, . . . 11) as shown in FIG. 3; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

TABLE 3

| Sequence index | Sequence |
| --- | --- |
| 0 | [1 1 1 1] |
| 1 | [1 −1 1 −1] |
| 2 | [1 −1 −1 1] |
| 3 | [1 1 −1 −1] |

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 2 and no SRS is transmitted, therefore the number of OFDM symbols occupied by the ACK/NACK message is 5 in each slot, thus the Walsh sequence is extended into an orthogonal sequence shown in Table 4.

TABLE 4

| Sequence index | Orthogonal sequence $[w(0) \ldots w(N_{SF}^{PUCCH} - 1)]$ |
| --- | --- |
| 0 | [1 1 1 1 1] |
| 1 | [1 −1 1 −1 −1] |
| 2 | [1 −1 −1 1 1] |
| 3 | [1 1 −1 −1 1] |

The $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$: an orthogonal sequence $[w(0) \ldots w(4)]$ is selected from Table 4 to respectively perform time-domain spreading on the $Q_1', Q_2', \ldots Q_{11}'$ and $Q_{12}', Q_{13}', \ldots Q_{23}'$ map the $Q_1', Q_2', \ldots Q_{11}'$ and $Q_{12}', Q_{13}', \ldots Q_{23}'$ to the zeroth, second, third, fourth and sixth OFDM symbols in each slot; a pilot sequence is mapped to the first and fifth OFDM symbols in each slot; a pilot frequency on the two OFDM symbols can be formed in the following manners: the pilot sequence in each OFDM symbol is $r_{u,v}^{\alpha}(n)$ (n=0, 1, ... 11), or time-domain spreading is performed on the $r_{u,v}^{\alpha}(n)$ (n=0, 1, ... 11) using an orthogonal sequence $[w(0)\ w(1)]$ selected from Table 5 (or Table 6).

TABLE 5

| Sequence index | Sequence |
| --- | --- |
| 0 | [1 1] |
| 1 | [1 −1] |

TABLE 6

| Sequence index | Sequence |
| --- | --- |
| 0 | [1 j] |
| 1 | [1 −j] |

Embodiment 2

Figure 4:
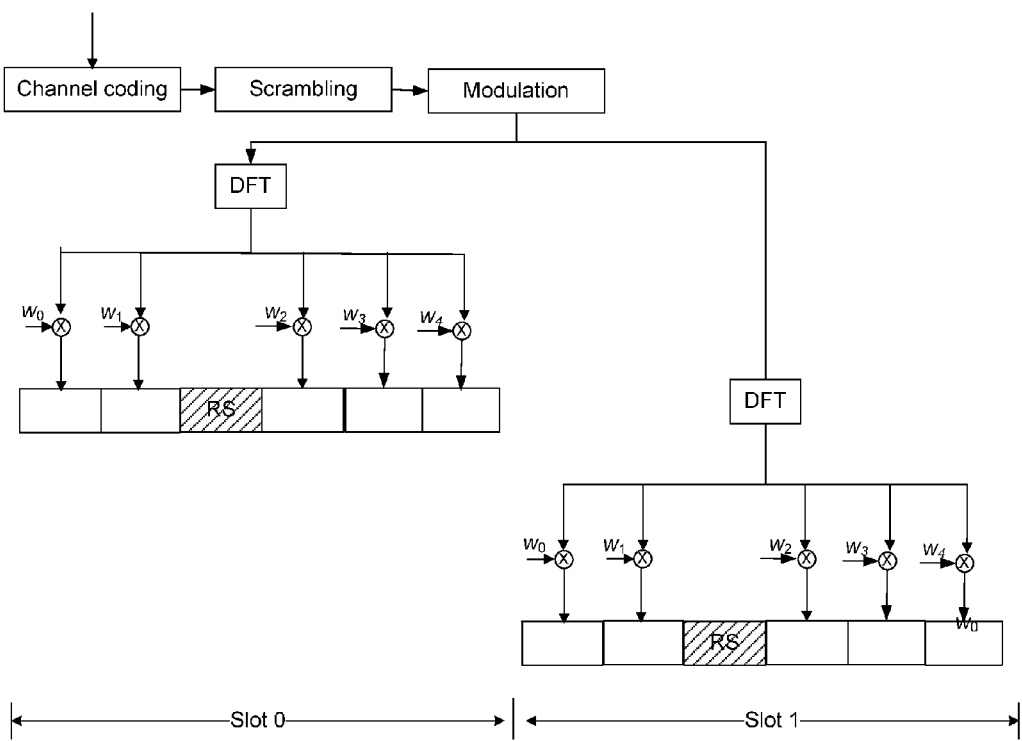
FIG. 4 shows a schematic diagram of preprocessing according to an Embodiment 2 of the disclosure.

Supposing an ACK/NACK message needing to be transmitted is $O_0, O_1, \ldots O_7$; the system adopts an extended cyclic prefix; no SRS needs to be transmitted; the number of OFDM symbols occupied by a DM RS is 1 and the DM RS is distributed in the second OFDM symbol of each slot, as shown in FIG. 4; different control information is borne in respective slots; the linear block code is the basic sequence shown in Table 1; the orthogonal code is a Walsh sequence, as shown in Table 7, the modulation order $Q_m=2$; and the preprocessing method described in the forgoing Mode 2 is adopted.

TABLE 7

| Sequence index | Sequence |
| --- | --- |
| 0 | [1 1 1 1 1] |
| 1 | [1 $e^{j8\pi/5}\ e^{j6\pi/5}\ e^{j4\pi/5}\ e^{j2\pi/5}$] |
| 2 | [1 $e^{j6\pi/5}\ e^{j2\pi/5}\ e^{j8\pi/5}\ e^{j4\pi/5}$] |
| 3 | [1 $e^{j4\pi/5}\ e^{j8\pi/5}\ e^{j2\pi/5}\ e^{j6\pi/5}$] |
| 4 | [1 $e^{j2\pi/5}\ e^{j4\pi/5}\ e^{j6\pi/5}\ e^{j8\pi/5}$] |

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has six OFDM symbols, the number of OFDM symbols occupied by the DM RS is 1 and no SRS is transmitted, therefore the number of OFDM symbols occupied by the ACK/NACK message is 5 in each slot; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(4)]$ is selected from Table 5 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}', Q_{13}', \ldots Q_{23}'$ to the zeroth, first, third, fourth and fifth OFDM symbols in each slot; a pilot sequence $r_{u,v}^{\alpha}(n)$ (n=0, 1, ... 11) is mapped to the second OFDM symbol in each slot.

Embodiment 3

Figure 5:
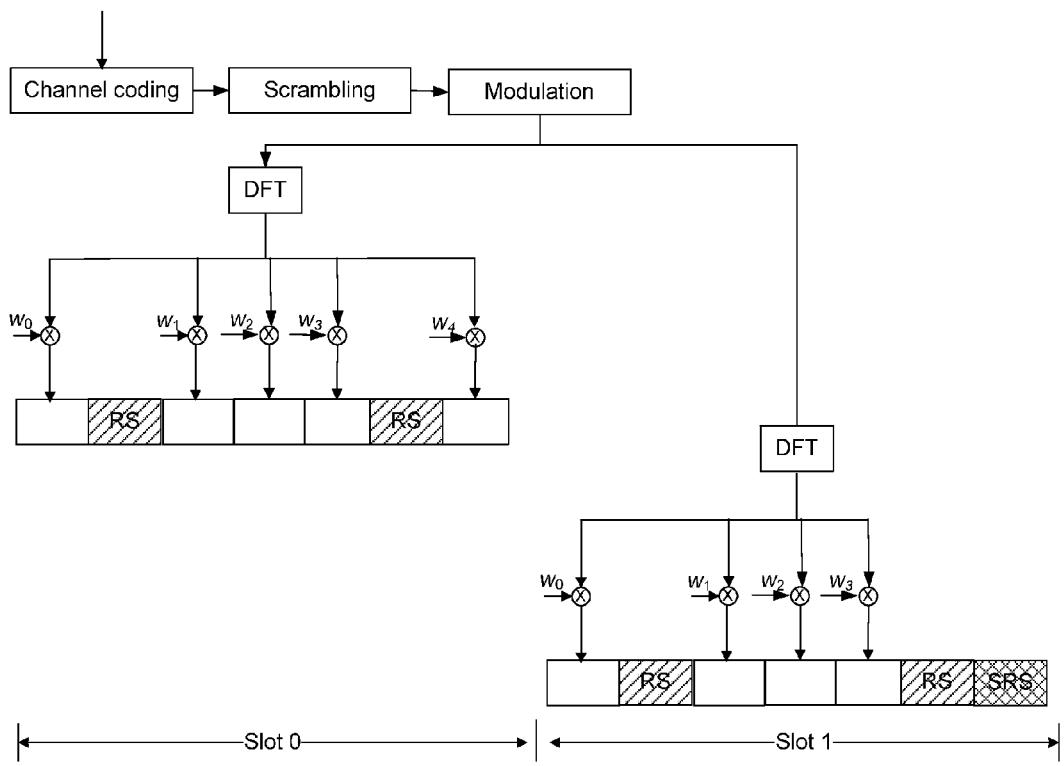
FIG. 5 shows a schematic diagram of preprocessing according to an Embodiment 3 of the disclosure.

Supposing an ACK/NACK message needing to be transmitted is $O_0, O_1, \ldots O_7$; the system adopts a normal cyclic prefix; an SRS needs to be transmitted; the number of OFDM symbols occupied by a DM RS is 2 and the DM RS is distributed in the first and fifth OFDM symbols of each slot in a discontinuous manner, as shown in FIG. 5; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 2 and an SRS is transmitted, therefore the number of OFDM symbols occupied by the ACK/NACK message is 5 in the slot0, and the number of OFDM symbols occupied by the ACK/NACK message is 4 in the slot1, thereby the Walsh sequence is repeated to 5 and the orthogonal sequence is as shown in Table 4.

The $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$ an orthogonal sequence $[w(0) \ldots w(4)]$ is selected from Table 4 to perform time-domain spreading on the $Q_1', Q_2', \ldots Q_{11}'$ to map the $Q_1', Q_2', \ldots Q_{11}'$ to the zeroth, second, third, fourth and sixth OFDM symbols in the slot0; an orthogonal sequence $[w(0) \ldots w(3)]$ is selected from Table 3 to perform time-domain spreading on the $Q_{12}', Q_{13}', \ldots Q_{23}'$ to map the $Q_{12}', Q_{13}', \ldots Q_{23}'$ to the zeroth, second, third and fourth OFDM symbols in the slot1; a pilot sequence is mapped to the first and fifth OFDM symbols in each slot; a pilot frequency on the two OFDM symbols can be formed in the following manners: the pilot sequence in each OFDM symbol is $r_{u,v}^{\alpha}(n)$ (n=0, 1, ... 11), or time-domain spreading is performed on the $r_{u,v}^{\alpha}(n)$ (n=0, 1, ... 11) using an orthogonal sequence $[w(0)\ w(1)]$ selected from Table 7.

Embodiment 4

Figure 6:
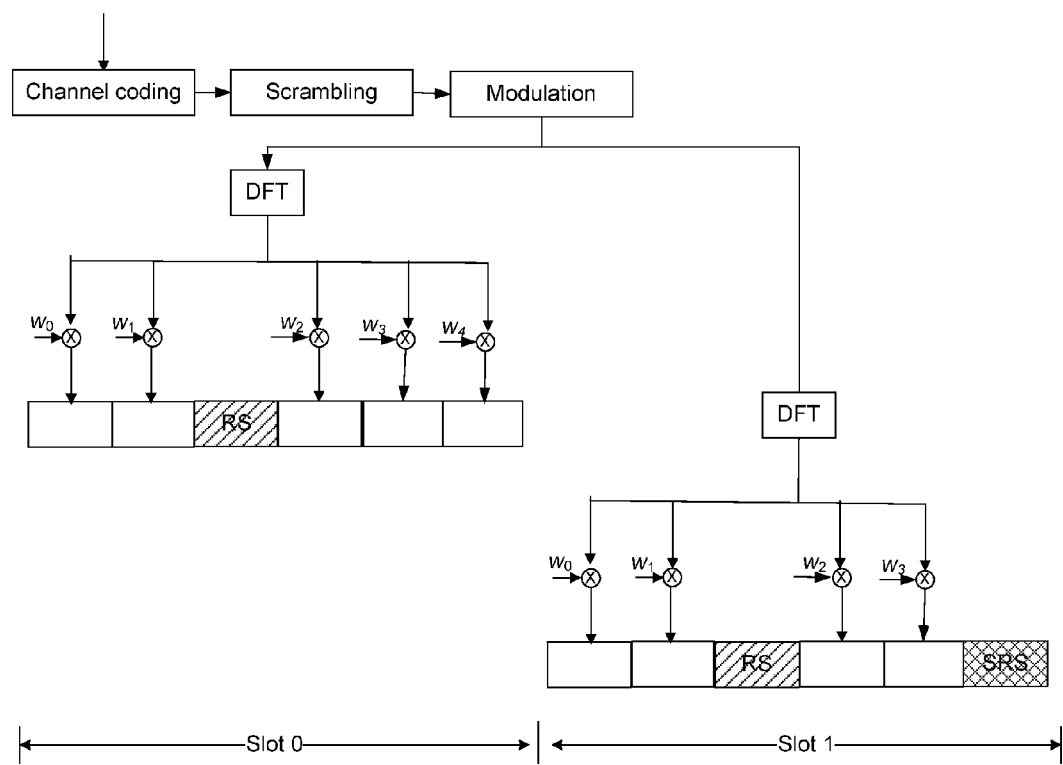
FIG. 6 shows a schematic diagram of preprocessing according to an Embodiment 4 of the disclosure.

Supposing an ACK/NACK message needing to be transmitted is $O_0, O_1, \ldots O_7$; the system adopts an extended cyclic prefix; an SRS needs to be transmitted; the number of OFDM symbols occupied by a DM RS is 1, and the DM RS is distributed in the second OFDM symbol of each slot in a continuous manner, as shown in FIG. 6; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has six OFDM symbols, the number of OFDM symbols occupied by the DM RS is 1 and an SRS is transmitted, therefore the number of OFDM symbols occupied by the ACK/NACK message is 5 in the slot0, and the number of OFDM symbols occupied by the ACK/NACK message is 4 in the slot1, thereby the Walsh sequence is repeated to 5 and the orthogonal sequence is as shown in Table 4.

The $Q_0, Q_1, \ldots Q_{11}$ are respectively precoded to obtain $Q_2', Q_3', \ldots Q_{11}'$ and $Q_{12}', Q_{13}', \ldots Q_{23}'$ an orthogonal sequence $[w(0) \ldots w(4)]$ is selected from Table 4 to perform time-domain spreading on the $Q_1', Q_2', \ldots Q_{11}'$ to map the $Q_1', Q_2', \ldots Q_{11}'$ to the zeroth, first, second, fourth and fifth OFDM symbols in the slot0; an orthogonal sequence $[w(0) \ldots w(3)]$ is selected from Table 3 to perform time-domain spreading on the $Q_{12}', Q_{13}', \ldots Q_{23}'$ to map the $Q_{12}', Q_{13}', \ldots Q_{23}'$ to the zeroth, first, third and fourth OFDM symbols in the slot1; a pilot sequence is mapped to the second OFDM symbol.

Embodiment 5

Figure 7:
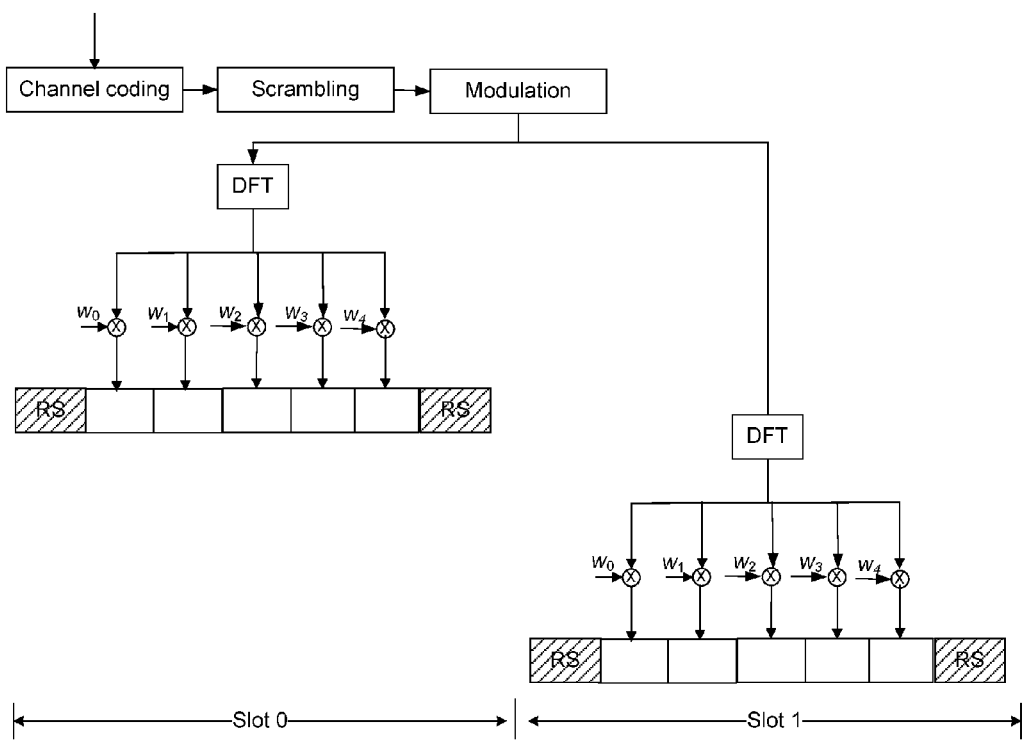
FIG. 7 shows a schematic diagram of preprocessing according to an Embodiment 5 of the disclosure.

Supposing an ACK/NACK message needing to be transmitted is $O_0, O_1, \ldots O_7$; the system adopts a normal cyclic prefix; no SRS needs to be transmitted; the number of OFDM symbols occupied by a DM RS is 2, and the DM RS is distributed in the zeroth and sixth OFDM symbols of each slot in a discontinuous manner, as shown in FIG. 7; different control information is borne in respective slots; the linear block code is the basic sequence shown in Table 1; the orthogonal code is a DFT sequence, as shown in Table 5, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 2 and no SRS is transmitted, therefore the number of OFDM symbols occupied by the ACK/NACK message is 5 in each slot; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(4)]$ is selected from Table 5 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}', Q_{13}', \ldots Q_{23}'$ to the first, second, third, fourth and fifth OFDM symbols in each slot; a pilot sequence is mapped to the zeroth and sixth OFDM symbols in each slot; a pilot sequence is mapped to the zeroth and sixth OFDM symbols; a pilot frequency on the two OFDM symbols can be formed in the following manners: the pilot sequence in each OFDM symbol is $r_{u,v}^{\alpha}(n)$ ($n=0, 1, \ldots 11$), or time-domain spreading is performed on the $r_{u,v}^{\alpha}(n)$ ($n=0, 1, \ldots 11$) using an orthogonal sequence $[w(0) w(1)]$ selected from Table 5.

Embodiment 6

Figure 8:
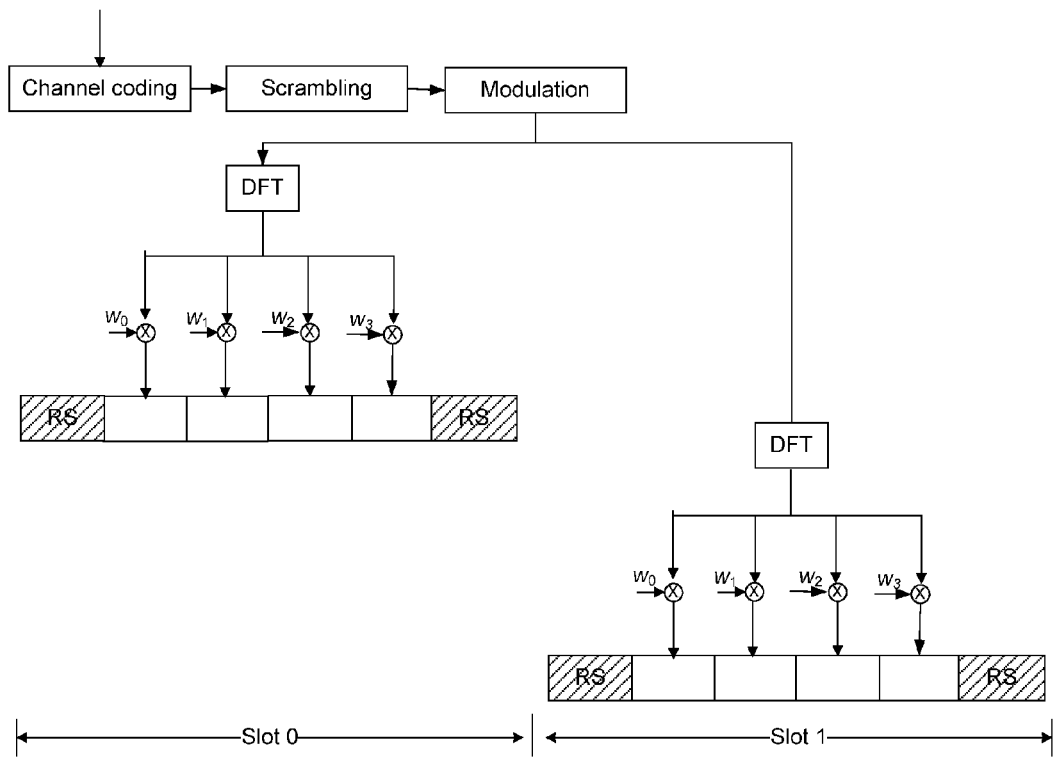
FIG. 8 shows a schematic diagram of preprocessing according to an Embodiment 6 of the disclosure.

Supposing an ACK/NACK message needing to be transmitted is $O_0, O_1, \ldots O_7$; the system adopts an extended cyclic prefix; no SRS needs to be transmitted; the number of OFDM symbols occupied by a DM RS is 2 and the DM RS is distributed in the zeroth and fifth OFDM symbols of each slot in a discontinuous manner, as shown in FIG. 8; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has six OFDM symbols, the number of OFDM symbols occupied by the DM RS is 2 and no SRS is transmitted, therefore the number of OFDM symbols occupied by the ACK/NACK message is 4 in each slot; the $Q_0, q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(3)]$ is selected from Table 3 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}', Q_{13}', \ldots Q_{23}'$ to the first, second, third and fourth OFDM symbols in each slot; a pilot sequence is mapped to the zeroth and fifth OFDM symbols in each slot; a pilot frequency on the two OFDM symbols can be formed in the following manners: the pilot sequence in each OFDM symbol is $r_{u,v}^{\alpha}(n)$ ($n=0, 1, \ldots 11$), or time-domain spreading is performed on the $r_{u,v}^{\alpha}(n)$ ($n=0, 1, \ldots 11$) using an orthogonal sequence $[w(0) w(1)]$ selected from Table 7.

Embodiment 7

Figure 9:
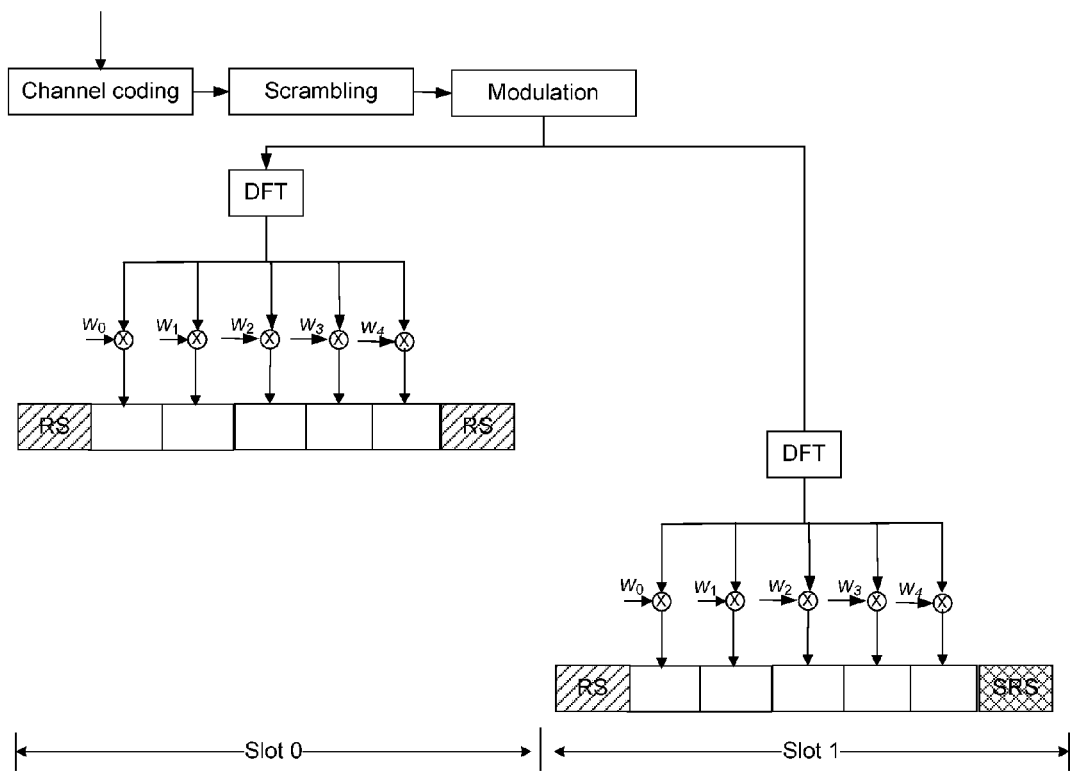
FIG. 9 shows a schematic diagram of preprocessing according to an Embodiment 7 of the disclosure.

Supposing an ACK/NACK message needing to be transmitted is $O_0, O_1, \ldots O_7$; the system adopts a normal cyclic prefix; an SRS needs to be transmitted; the number of OFDM symbols occupied by a DM RS is 2 and the DM RS is distributed in the first and seventh OFDM symbols of each slot in a discontinuous manner, as shown in FIG. 9; different control information is borne in respective slots; the linear block code is the basic sequence shown in Table 1; the orthogonal code is a DFT sequence, as shown in Table 7, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 2 and an SRS is transmitted, therefore the number of OFDM symbols occupied by the ACK/NACK message is 5 in the slot0, and the number of OFDM symbols occupied by the ACK/NACK message is 5 in the slot1; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(4)]$ is selected from Table 5 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}', Q_{13}', \ldots Q_{23}'$ to the first, second, third, fourth and fifth OFDM symbols in each slot; a pilot sequence is mapped to the zeroth and sixth OFDM symbols in each slot; a pilot frequency on the two OFDM symbols can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence [w(0) w(1)] selected from Table 5.

Embodiment 8

Figure 10:
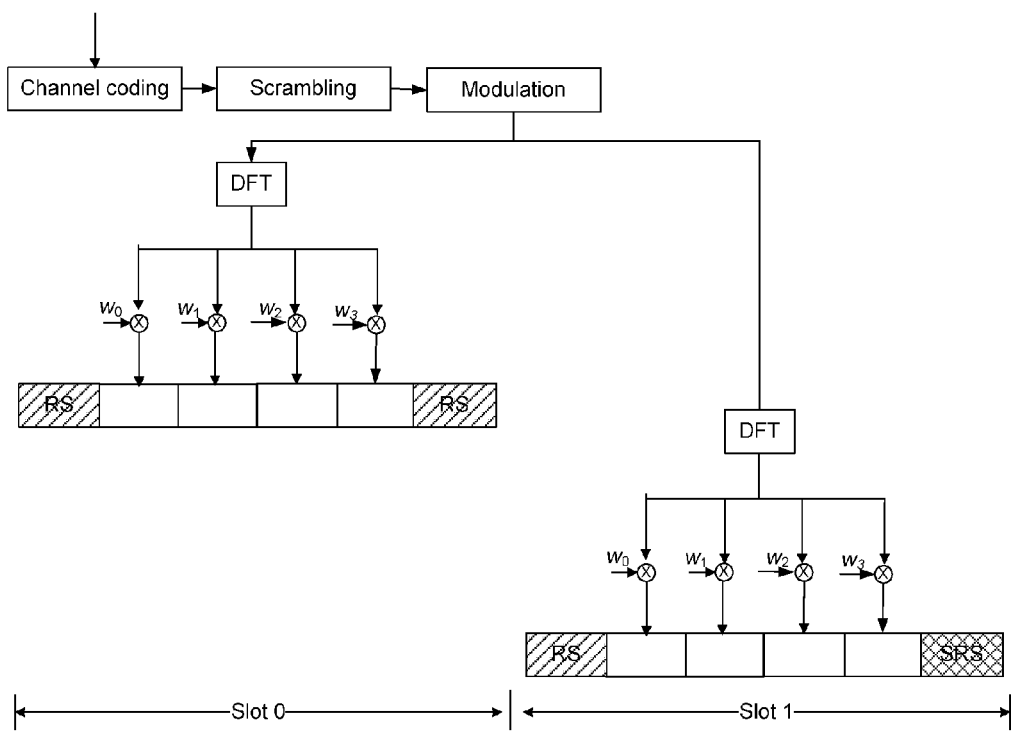
FIG. 10 shows a schematic diagram of preprocessing according to an Embodiment 8 of the disclosure.

Supposing an ACK/NACK message needing to be transmitted is $O_0, O_1, \ldots O_7$; the system adopts an extended cyclic prefix; an SRS needs to be transmitted; the number of OFDM symbols occupied by a DM RS is 2, and the DM RS is distributed in the zeroth and fifth OFDM symbols of each slot in a discontinuous manner, as shown in FIG. 10; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has six OFDM symbols, the number of OFDM symbols occupied by the DM RS is 2 and no SRS is transmitted, therefore the number of OFDM symbols occupied by the ACK/NACK message is 4 in each slot; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence [w(0) ... w(3)] is selected from Table 3 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}'. Q_{13}', \ldots Q_{23}'$ to the first, second, third and fourth OFDM symbols in each slot; a pilot sequence is mapped to the zeroth and fifth OFDM symbols in each slot; a pilot frequency on the two OFDM symbols can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence [w(0) w(1)] selected from Table 7.

Embodiment 9

Figure 11:
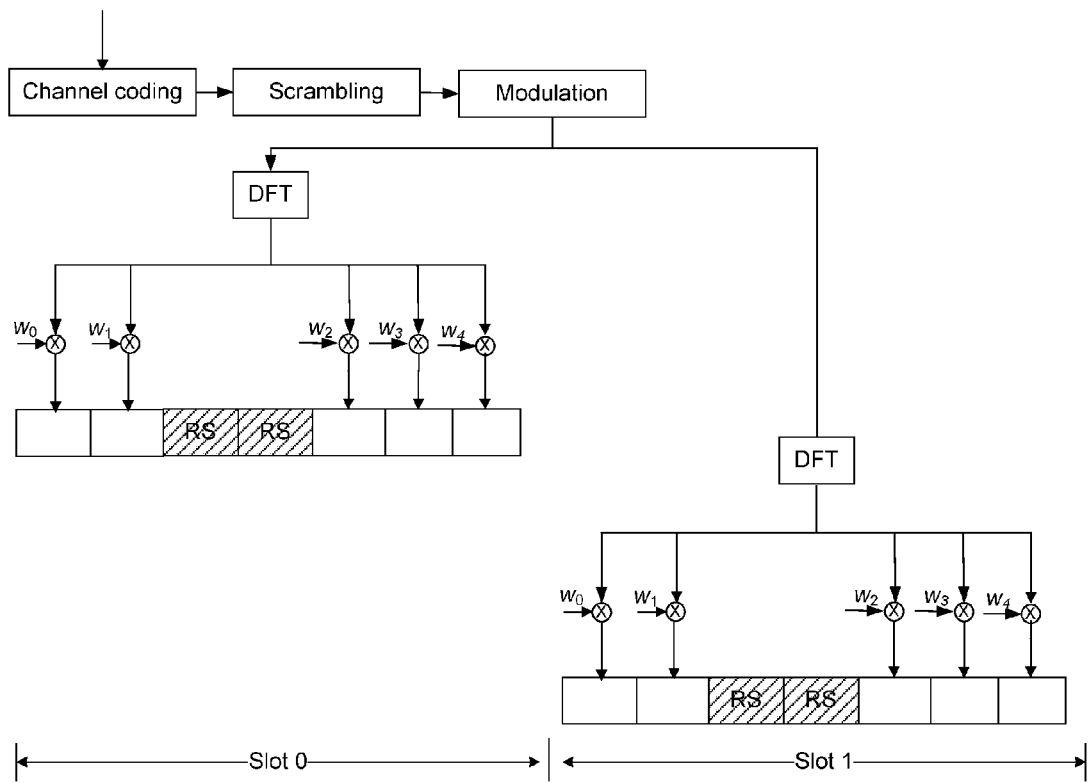
FIG. 11 shows a schematic diagram of preprocessing according to an Embodiment 9 of the disclosure.

Supposing an ACK/NACK message needing to be transmitted is $O_0, O_1, \ldots O_7$; the system adopts a normal cyclic prefix; no SRS needs to be transmitted; the number of OFDM symbols occupied by a DM RS is 2, and the DM RS is distributed in the second and third OFDM symbols of each slot in a continuous manner, as shown in FIG. 11; different control information is borne in respective slots; the linear block code is the basic sequence shown in Table 1; the orthogonal code is a DFT sequence, as shown in Table 7, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 2 and no SRS is transmitted, therefore the number of OFDM symbols occupied by the ACK/NACK message is 5 in each slot; the $Q_0, Q_1, \ldots Q_{11}$ and $Q_{12}, Q_{13} \ldots Q_{23}$ an are respectively precoded to obtain $Q_1', Q_2', \ldots Q_{11}'$ and $Q_{12}', Q_{13}', \ldots Q_{23}'$; an orthogonal sequence [w(0) ... w(4)] is selected from Table 5 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}', Q_{13}', \ldots Q_{23}'$ to the zeroth, first, fourth, fifth and sixth OFDM symbols in each slot; a pilot sequence is mapped to the second and third OFDM symbols in each slot; a pilot frequency on the two OFDM symbols can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence [w(0) w(1)] selected from Table 7.

Embodiment 10

Figure 12:
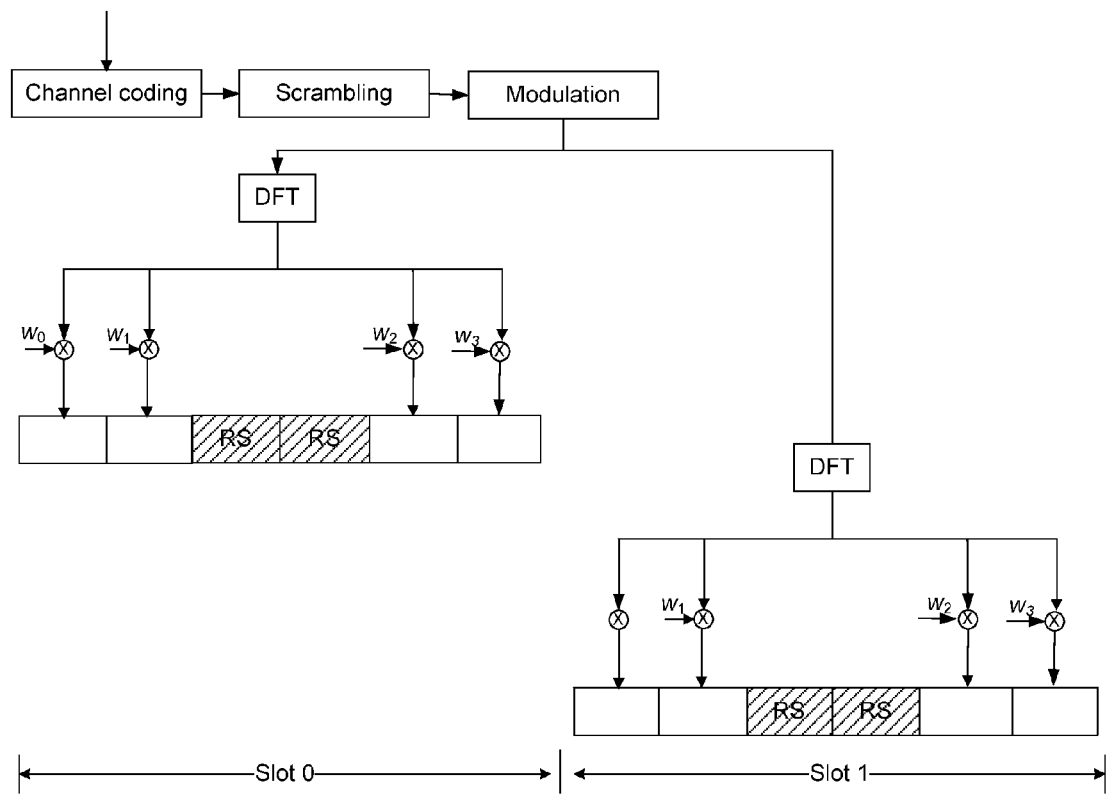
FIG. 12 shows a schematic diagram of preprocessing according to an Embodiment 10 of the disclosure.

Supposing an ACK/NACK message needing to be transmitted is $O_0, O_1, \ldots O_7$; the system adopts an extended cyclic prefix; no SRS needs to be transmitted; the number of OFDM symbols occupied by a DM RS is 2 and the DM RS is distributed in the second and third OFDM symbols of each slot in a continuous manner, as shown in FIG. 12; different control information is borne in respective slots; the linear block code is the basic sequence shown in Table 1; the orthogonal code is a Walsh sequence, as shown in Table 7, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has six OFDM symbols, the number of OFDM symbols occupied by the DM RS is 2 and no SRS is transmitted, therefore the number of OFDM symbols occupied by the ACK/NACK message is 4 in each slot; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence [w(0) ... w(3)] is selected from Table 3 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}, Q_{13}', \ldots Q_{23}'$ to the zeroth, first, fourth and fifth symbols in each slot; a pilot sequence is mapped to the second and third OFDM symbols in each slot; a pilot frequency on the two OFDM symbols can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence [w(0) w(1)] selected from Table 7.

Embodiment 11

Figure 13:
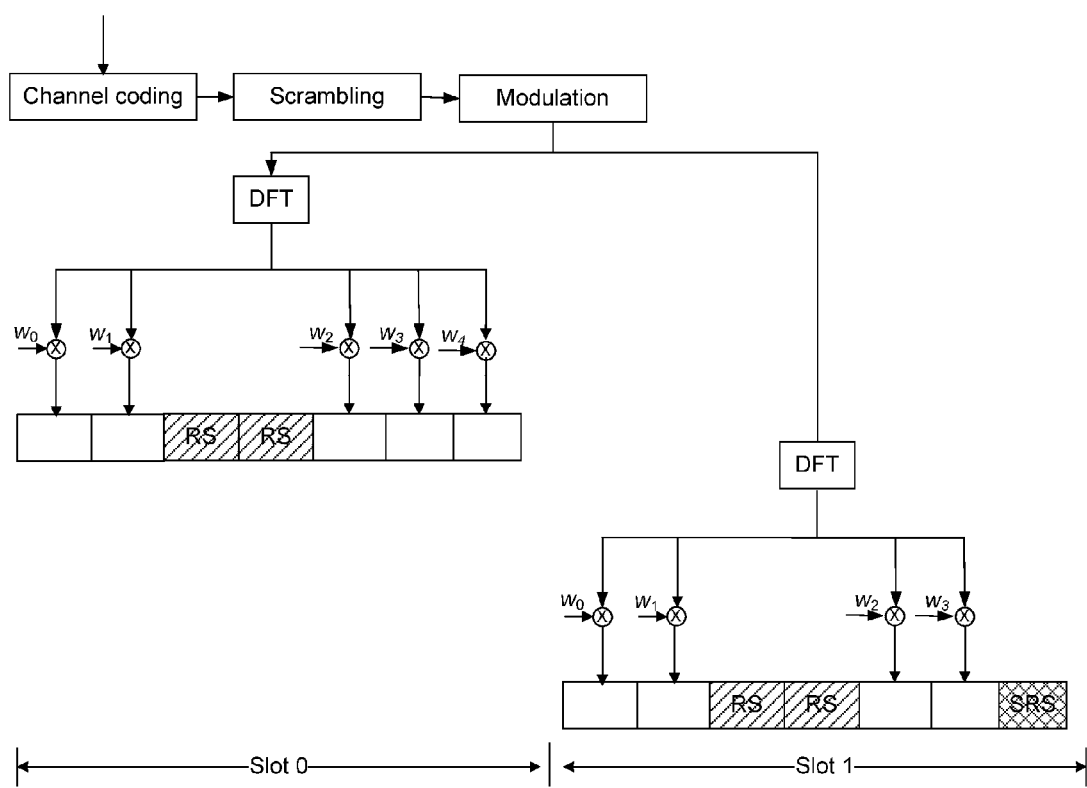
FIG. 13 shows a schematic diagram of preprocessing according to an Embodiment 11 of the disclosure.

Supposing an ACK/NACK message needing to be transmitted is $O_0, O_1, \ldots O_7$; the system adopts a normal cyclic prefix; an SRS needs to be transmitted; the number of OFDM symbols occupied by a DM RS is 2, and the DM RS is distributed in the second and third OFDM symbols of each slot in a continuous manner, as shown in FIG. 13; different control information is borne in respective slots; the linear block code is the basic sequence shown in Table 1; the orthogonal code is a DFT sequence and a Walsh sequence, as shown in Table 7 and Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 2 and an SRS is transmitted, therefore the number of OFDM symbols occupied by the ACK/NACK message is 5 in the slot0, and the number of OFDM symbols occupied by the ACK/NACK message is 4 in the slot1; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(4)]$ is selected from Table 5 to perform time-domain spreading on the $Q_1', Q_2', \ldots Q_{11}'$ to map the $Q_1', Q_2', \ldots Q_{11}'$ to the zeroth, first, fourth, fifth and sixth OFDM symbols in the slot0; an orthogonal sequence $[w(0) \ldots w(3)]$ is selected from Table 3 to perform time-domain spreading on the $Q_{12}', Q_{13}', \ldots Q_{23}'$ to map the $Q_{12}', Q_{13}', \ldots Q_{23}'$ to the zeroth, first, fourth and fifth symbols in the slot1; a pilot sequence is mapped to the second and third OFDM symbols in each slot; a pilot frequency on the two OFDM symbols can be formed in the following manners: the pilot sequence in each OFDM symbol is $r_{u,v}^{\alpha}(n)$ ($n=0, 1, \ldots 11$), or time-domain spreading is performed on the $r_{u,v}^{\alpha}(n)$ ($n=0, 1, \ldots 11$) using an orthogonal sequence $[w(0)\ w(1)]$ selected from Table 7.

Embodiment 12

Figure 14:
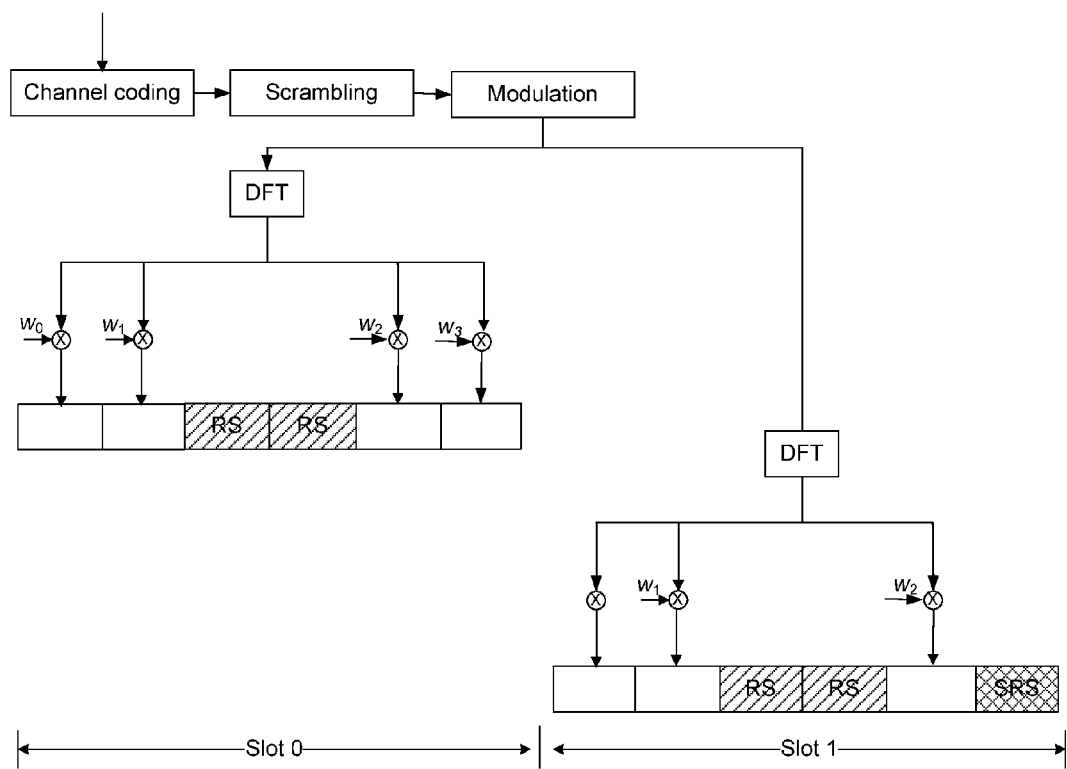
FIG. 14 shows a schematic diagram of preprocessing according to an Embodiment 12 of the disclosure.

Supposing an ACK/NACK message needing to be transmitted is $O_0, O_1, \ldots O_7$; the system adopts an extended cyclic prefix; an SRS needs to be transmitted; the number of OFDM symbols occupied by a DM RS is 2 and the DM RS is distributed in the second and third OFDM symbols of each slot in a continuous manner, as shown in FIG. 14; different control information is borne in respective slots; the linear block code is the basic sequence shown in Table 1; the orthogonal code is a Walsh sequence, as shown in Table 7 and Table 8, the modulation order $Q_m=2$; and the preprocessing method described in the forgoing Mode 2 is adopted.

TABLE 8

| Sequence index | Sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has six OFDM symbols, the number of OFDM symbols occupied by the DM RS is 2 and an SRS is transmitted, therefore the number of OFDM symbols occupied by the ACK/NACK message is 4 in the slot0, and the number of OFDM symbols occupied by the ACK/NACK message is 4 in the slot1; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(3)]$ is selected from Table 3 to perform time-domain spreading on the $Q_1', Q_2', \ldots Q_{11}'$ to map the $Q_1', Q_2', \ldots Q_{11}'$ to the zeroth, first, fourth and fifth symbols in the slot0; an orthogonal sequence $[w(0) \ldots w(2)]$ is selected from Table 8 to perform time-domain spreading on the $Q_{12}', \ldots Q_{23}'$ to map the $Q_{12}', Q_{13}', \ldots Q_{23}'$ to the zeroth, first and fourth OFDM symbols in the slot1; a pilot sequence is mapped to the second and third OFDM symbols in each slot; a pilot frequency on the two OFDM symbols can be formed in the following manners: the pilot sequence in each OFDM symbol is $r_{u,v}^{\alpha}(n)$ ($n=0, 1, \ldots 11$), or time-domain spreading is performed on the $r_{u,v}^{\alpha}(n)$ ($n=0, 1, \ldots 11$) using an orthogonal sequence $[w(0)\ w(1)]$ selected from Table 7.

Embodiment 13

Figure 15:
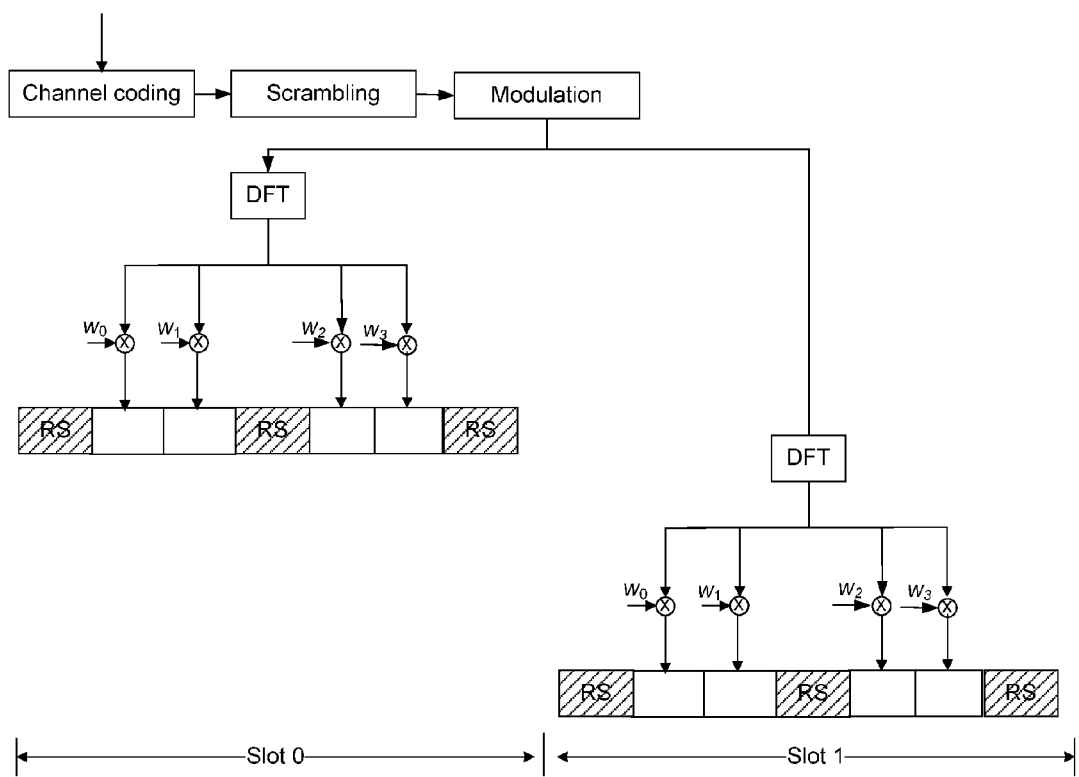
FIG. 15 shows a schematic diagram of preprocessing according to an Embodiment 13 of the disclosure.

Supposing an ACK/NACK message needing to be transmitted is $O_0, O_1, \ldots O_7$; the system adopts a normal cyclic prefix; no SRS needs to be transmitted; the number of OFDM symbols occupied by a DM RS is 3, the DM RS is distributed in the zeroth, third and sixth OFDM symbols of each slot in a discontinuous manner, and the sequence of the DM RS is $r_{u,v}^{\alpha}(n)$ ($n=0, 1, \ldots 11$) as shown in FIG. 15; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 3 and no SRS is transmitted, therefore the number of OFDM symbols occupied by the ACK/NACK message is 4 in each slot; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(3)]$ is selected from Table 3 to respectively perform time-domain spreading on the $Q_1', Q_2', \ldots Q_{11}'$ and $Q_{12}', Q_{13}', \ldots Q_{23}'$ to map the $Q_1', Q_2', \ldots Q_{11}'$ and $Q_{12}', Q_{13}', \ldots Q_{23}'$ to the first, second, fourth and fifth OFDM symbols in each slot; a pilot sequence is mapped to the zeroth, third and sixth OFDM symbols in each slot; a pilot frequency on the three OFDM symbols can be formed in the following manners: the pilot sequence in each OFDM symbol is $r_{u,v}^{\alpha}(n)$ ($n=0, 1, \ldots 11$), or time-domain spreading is performed on the $r_{u,v}^{\alpha}(n)$ ($n=0, 1, \ldots 11$) using an orthogonal sequence $[w(0) \ldots w(2)]$ selected from Table 6.

Embodiment 14

Figure 16:
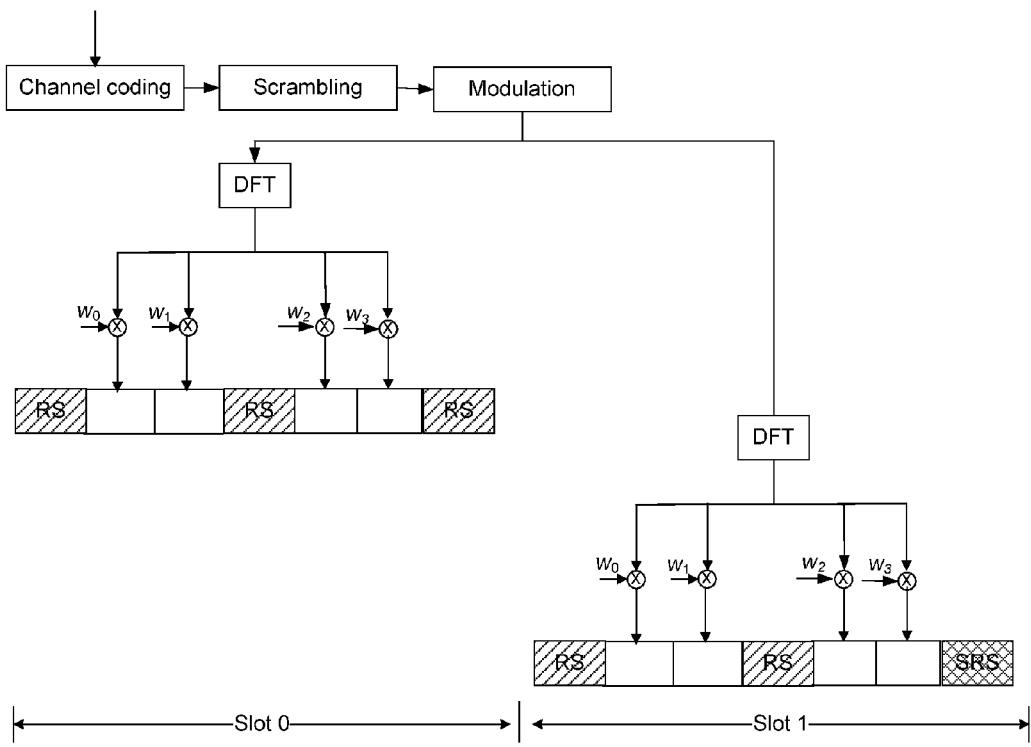
FIG. 16 shows a schematic diagram of preprocessing according to an Embodiment 14 of the disclosure.

Supposing an ACK/NACK message needing to be transmitted is $O_0, O_1, \ldots O_7$; the system adopts a normal cyclic prefix; an SRS needs to be transmitted; the number of OFDM symbols occupied by a DM RS is 3, and the DM RS is distributed in the zeroth, third and sixth OFDM symbols of each slot in a discontinuous manner, as shown in FIG. 16; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 3 and an SRS is transmitted, therefore the number of OFDM symbols occupied by the ACK/NACK message is 4 in the slot0, and the number of OFDM symbols occupied by the ACK/NACK message is 4 in the slot1; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(3)]$ is selected from Table 3 to perform time-domain spreading on the $Q_1', Q_2', \ldots Q_{11}'$ to map the $Q_1', Q_2', \ldots Q_{11}'$ to the first, second, fourth and fifth OFDM symbols in the slot0; an orthogonal sequence $[w(0) \ldots w(3)]$ is selected from Table 3 to perform time-domain spreading on the $Q_{12}', Q_{13}', \ldots Q_{23}'$ to map the $Q_{12}', Q_{13}', \ldots Q_{23}'$ to the first, second, fourth and fifth OFDM symbols in the slot1; a pilot sequence is mapped to the zeroth, third and sixth OFDM symbols in the slot0 and the zeroth and third OFDM symbols in the slot 1; a pilot frequency on the three OFDM symbols of the slot0 can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence $[w(0) \ldots w(2)]$ selected from Table 6; a pilot frequency on the two OFDM symbols of the slot1 can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence $[w(0) w(1)]$ selected from Table 7.

Embodiment 15

Figure 17:
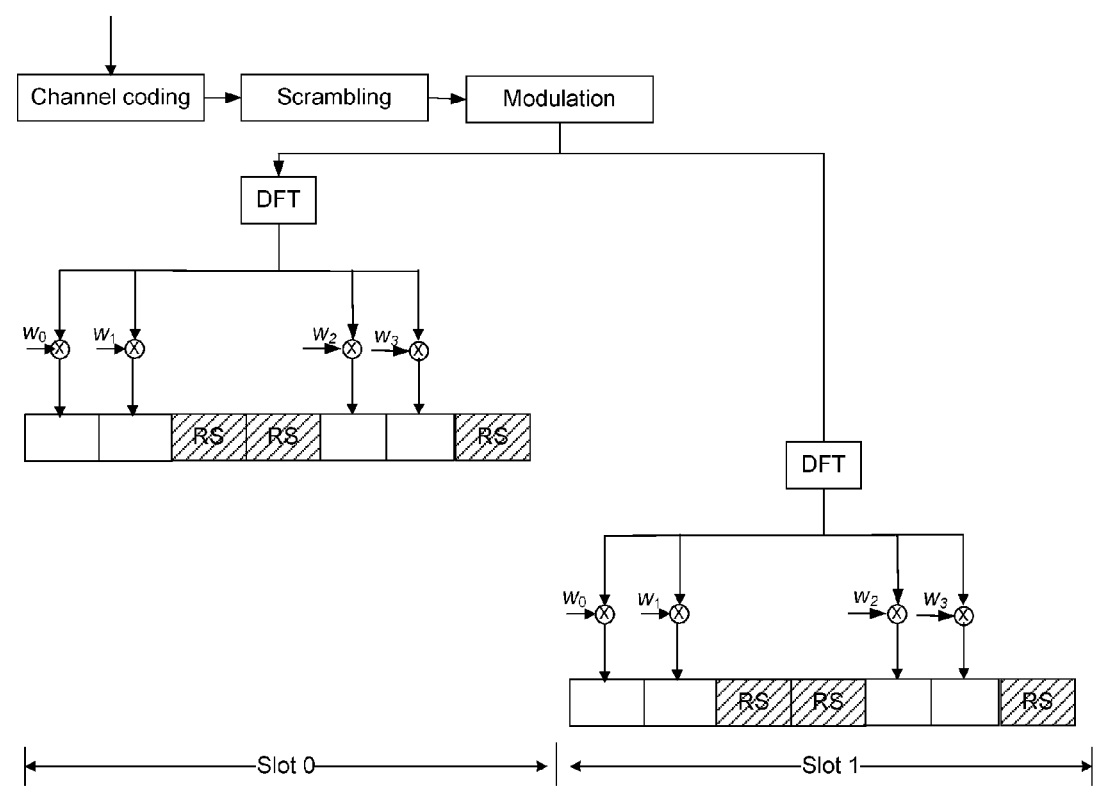
FIG. 17 shows a schematic diagram of preprocessing according to an Embodiment 15 of the disclosure.

Supposing an ACK/NACK message needing to be transmitted is $O_0, O_1, \ldots O_7$; the system adopts an extended cyclic prefix; no SRS needs to be transmitted; the number of OFDM symbols occupied by a DM RS is 3, and the DM RS is distributed in the second, third and sixth OFDM symbols of each slot in a partially continuous manner, as shown in FIG. 17; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 3 and an SRS is transmitted, therefore the number of OFDM symbols occupied by the ACK/NACK message is 4 in the slot0, and the number of OFDM symbols occupied by the ACK/NACK message is 4 in the slot1; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(3)]$ is selected from Table 3 to perform time-domain spreading on the $Q_1', Q_2', \ldots Q_{11}'$ to map the $Q_1', Q_2', \ldots Q_{11}'$ to the zeroth, first, fourth and fifth OFDM symbols in the slot0; an orthogonal sequence $[w(0) \ldots w(3)]$ is selected from Table 3 to perform time-domain spreading on the $Q_{12}', Q_{13}', \ldots Q_{23}'$ to map the $Q_{12}', Q_{13}', \ldots Q_{23}'$ to the zeroth, first, fourth and fifth OFDM symbols in the slot1; a pilot sequence is mapped to the second, third and sixth OFDM symbols in the slot0 and the second, third and sixth OFDM symbols in the slot 1; a pilot frequency on the three OFDM symbols of the slot0 can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence $[w(0) \ldots w(2)]$ selected from Table 6; a pilot frequency on the three OFDM symbols of the slot1 can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence $[w(0) \ldots w(2)]$ selected from Table 6.

Embodiment 16

Figure 18:
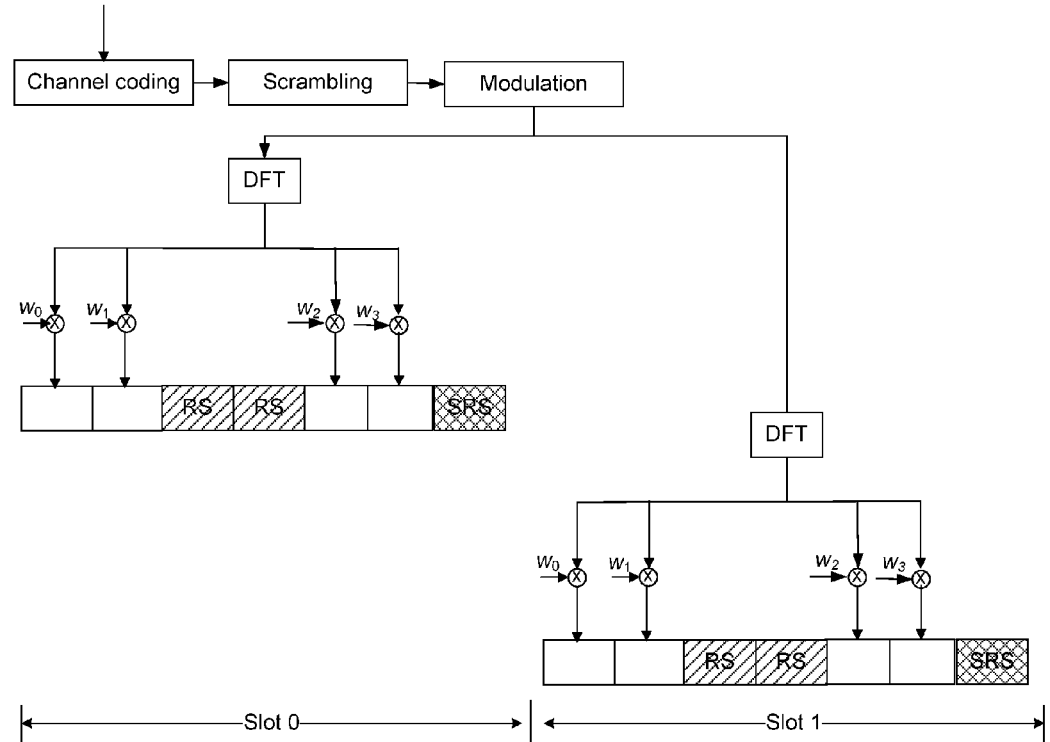
FIG. 18 shows a schematic diagram of preprocessing according to an Embodiment 16 of the disclosure.

Supposing an ACK/NACK message needing to be transmitted is $O_0, O_1, \ldots O_7$; the system adopts an extended cyclic prefix; an SRS needs to be transmitted; the number of OFDM symbols occupied by a DM RS is 3, and the DM RS is distributed in the second, third and sixth OFDM symbols of each slot in a partially continuous manner, as shown in FIG. 18; different control information is borne in respective slots; the linear block code is the basic sequence shown in Table 1; the orthogonal code is a Walsh sequence, as shown in Table 3, the modulation order $Q_m=2$; and the preprocessing method described in the forgoing Mode 2 is adopted.

The ACK/NACK message $O_0, O_1, \ldots O_7$ needing to be transmitted is coded; since the bit number of the ACK/NACK message needing to be transmitted is 8 bits and different control information is borne in respective slots, therefore coding is performed using the linear block code and the length of the coded sequence is 48, the coded sequence is $b_0, b_1, \ldots b_{47}$, and the scrambled and modulated sequence is $Q_0, Q_1, \ldots Q_{23}$; since each slot has seven OFDM symbols, the number of OFDM symbols occupied by the DM RS is 3 and an SRS is transmitted, therefore the number of OFDM symbols occupied by the ACK/NACK message is 4 in the slot0, and the number of OFDM symbols occupied by the ACK/NACK message is 4 in the slot1; the $Q_0, Q_1, \ldots Q_{11}$ and $Q_{12}, Q_{13}, \ldots Q_{23}$ are respectively precoded to obtain $Q_1', Q_2', \ldots Q_{11}'$ and $Q_{12}', Q_{13}', \ldots Q_{23}'$; an orthogonal sequence $[w(0) \ldots w(3)]$ is selected from Table 3 to perform time-domain spreading on the $Q_1', Q_2', \ldots Q_{11}'$ to map the $Q_1', Q_2', \ldots Q_{11}'$ to the zeroth, first, fourth and fifth OFDM symbols in the slot0; an orthogonal sequence $[w(0) \ldots w(3)]$ is selected from Table 3 to perform time-domain spreading on the $Q_{12}', Q_{13}', \ldots Q_{23}'$ to map the $Q_{12}', Q_{13}', \ldots Q_{23}'$ to the zeroth, first, fourth and fifth OFDM symbols in the slot1; a pilot sequence is mapped to the second, third and sixth OFDM symbols in the slot0 and the second and third OFDM symbols in the slot 1; a pilot frequency on the three OFDM symbols of the slot0 can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence $[w(0) \ldots w(2)]$ selected from Table 6; a pilot frequency on the two OFDM symbols of the slot1 can be formed in the following manners: the pilot sequence in each OFDM symbol is $r_{u,v}^\alpha(n)$ (n=0, 1, ... 11), or time-domain spreading is performed on the $r_{u,v}^\alpha(n)$ (n=0, 1, ... 11) using an orthogonal sequence $[w(0) w(1)]$ selected from Table 7.

In each of the above embodiments of the disclosure, the technical solution above also can be implemented by the preprocessing method described in the forgoing Mode 1. Since the implementation details with the preprocessing method described in the forgoing Mode 1 and forgoing Mode 2 are basically the same, no description is repeated here.

Figure 19:
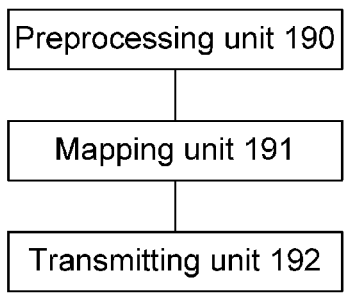
FIG. 19 shows a schematic diagram illustrating structure of an apparatus for transmitting uplink control signaling according to the disclosure.

FIG. 19 shows a schematic diagram illustrating structure of an apparatus for transmitting uplink control signaling according to the disclosure; as shown in FIG. 19, the apparatus for transmitting uplink control signaling in the disclosure includes a preprocessing unit 190, a mapping unit 191 and a transmitting unit 192, wherein the preprocessing unit 190 is configured to preprocess uplink control signaling for an uplink feedback;

the mapping unit 191 is configured to map the preprocessed uplink control signaling to an OFDM symbol used for bearing the uplink control signaling;

the transmitting unit 192 is configured to transmit the uplink control signaling.

The preprocessing unit 190 further includes a channel coding sub-unit, a scrambling sub-unit, a modulation sub-unit, a time-domain spreading sub-unit and a precoding transform sub-unit, wherein the channel coding sub-unit is configured to perform channel coding on the uplink control signaling;

the scrambling sub-unit is configured to scramble the uplink control signaling subjected to the channel coding;

the modulation sub-unit is configured to modulate the scrambled uplink control signaling;

the time-domain spreading sub-unit is configured to perform time-domain spreading on the modulated uplink control signaling;

the precoding transform sub-unit is configured to perform precoding transform on the uplink control signaling subjected to the time-domain spreading.

Preferably, the precoding transform sub-unit is further configured to perform precoding transform on the modulated uplink control signaling; and the time-domain spreading sub-unit is further configured to perform time-domain spreading on the uplink control signaling subjected to the precoding transform.

The channel coding sub-unit is further configured to perform coding using a tail biting convolution code with constraint length of 7 and code rate of 1/3, when a bit number of the uplink control signaling is greater than 11 bits; and perform coding using a linear block code when the bit number is no greater than 11 bits; wherein the length of the coded uplink control signaling is related to whether two slots in a sub-frame bear the same information, specifically, when two slots in a sub-frame bear the same information, the length of the coded uplink control signaling is 12xQm; and when two slots in a sub-frame bear different information, the length of the coded uplink control signaling is 24xQm, wherein Qm is a corresponding modulation order.

The scrambling sub-unit is further configured to add a scrambling sequence to the sequence of the coded uplink control signaling, and then perform an operation of mod 2 to obtain a scrambled sequence, wherein the scrambling sequence is formed by a pseudorandom sequence.

The modulation sub-unit is further configured to modulate the scrambled uplink control signaling by adopting a QPSK modulation mode.

The time-domain spreading sub-unit is further configured to spread the sequence of the processed uplink control signaling to an OFDM symbol used for bearing the uplink control signaling using an orthogonal sequence; wherein the orthogonal sequence is a DFT sequence, or a Walsh sequence, or a CAZAC sequence, or a spreading sequence of the DFT sequence, or a spreading sequence of the Walsh sequence, or a spreading sequence of the CAZAC sequence; and the length of the orthogonal sequence is equal to the number of OFDM symbols used for bearing the uplink control signaling in one slot.

The precoding transform sub-unit is further configured to perform a DFT operation on the sequence of the uplink control signaling in the OFDM symbol used for bearing the uplink control signaling.

The OFDM symbol used for bearing the uplink control signaling is OFDM symbols in a sub-frame other than the OFDM symbol occupied by an uplink reference signal.

The mapping unit 191 is configured to bear no uplink control signaling in the last OFDM symbol in the second slot of the sub-frame when the uplink control signaling and an SRS are borne in one sub-frame.

The uplink control signaling is ACK/NACK message or CSI.

Figure 20:
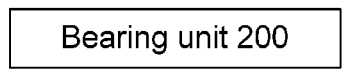
FIG. 20 shows a schematic diagram illustrating structure of an apparatus for bearing an uplink demodulation reference signal during transmission of uplink control signaling according to the disclosure.

FIG. 20 shows a schematic diagram illustrating structure of an apparatus for bearing an uplink demodulation reference signal during transmission of uplink control signaling according to the disclosure; as shown in FIG. 20, the apparatus for bearing an uplink demodulation reference signal during transmission of uplink control signaling in the disclosure includes a bearing unit 200 configured to bear an uplink demodulation reference signal in k OFDM symbols in each slot.

Wherein in a sub-frame with a normal cyclic prefix, k=2 or k=3;

in a sub-frame with an extended cyclic prefix, k=2 or k=1.

In the sub-frame with the normal cyclic prefix, three demodulation reference signals are respectively borne in the following OFDM symbols in each slot: a second OFDM symbol, a third OFDM symbol and a sixth OFDM symbol; or a zeroth OFDM symbol, a third OFDM symbol and a sixth OFDM symbol; or a first OFDM symbol, a third OFDM symbol and a fifth OFDM symbol;

in the sub-frame with a normal cyclic prefix, two demodulation reference signals are respectively borne in the following OFDM symbols in each slot: a zeroth OFDM symbol and a fifth OFDM symbol; or a zeroth OFDM symbol and a sixth OFDM symbol; or a first OFDM symbol and a fifth OFDM symbol; or a second OFDM symbol and a third OFDM symbol;

in the sub-frame with an extended cyclic prefix, two demodulation reference signals are respectively borne in the following OFDM symbols in each slot: a zeroth OFDM symbol and a fifth OFDM symbol; or a zeroth OFDM symbol and a fourth OFDM symbol; or a second OFDM symbol and a third OFDM symbol; or a first OFDM symbol and a fourth OFDM symbol; or a second OFDM symbol and a fifth OFDM symbol;

in the sub-frame with the extended cyclic prefix, one demodulation reference signal is borne in a second OFDM symbol or a third OFDM symbol in each slot;

wherein when two or more OFDM symbols are occupied by the uplink demodulation reference signal, the demodulation reference signal borne in each OFDM symbol is of the same sequence, or the sequence subjected to time-domain spreading, wherein the sequence is a CG-CAZAC sequence.

Those skilled in the art should understand that the apparatuses shown in FIG. 19 and FIG. 20 are respectively designed for implementing the method for transmitting the uplink control signal and the method for bearing the uplink demodulation reference signal during the transmission of the uplink control signaling; the implementation function of each processing unit can be understood with reference to the related description in the forgoing method. The function of each processing unit can be implemented by a program running on a processor, or can further be implemented by a corresponding logic circuit.

The above are only the preferred embodiments of the disclosure, and are not intended to limit the protection scope of the disclosure.

The invention claimed is:

1. A method for transmitting uplink control signaling, comprising:

a) preprocessing the uplink control signaling which is an Acknowledged/Non-Acknowledged (ACK/NACK) message supporting more than 4 bits, comprising:
  ai) successively performing, on the uplink control signaling, channel coding, scrambling, modulation, time-domain spreading and precoding transform, wherein when two slots in a sub-frame bear same information, a length of the coded uplink control signaling is 12×Qm, wherein Qm is a corresponding modulation order;
  or
  aii) successively performing, on the uplink control signaling, channel coding, scrambling, modulation, precoding transform and time-domain spreading, wherein when two slots in a sub-frame bear same information, a length of the coded uplink control signaling is 12×Qm, wherein Qm is a corresponding modulation order;
b) mapping the uplink control signaling to an Orthogonal Frequency Division Multiplexing (OFDM) symbol used for bearing the uplink control signaling;
c) transmitting the uplink control signaling that is borne in the OFDM symbol; and
d) bearing a demodulation reference signal in k OFDM symbols in each slot, wherein
  di) when the k OFDM symbols in the sub-frame have an extended cyclic prefix, k=1;
  or
  dii) when the k OFDM symbols in the sub-frame have an normal cyclic prefix, k=2.

2. The method according to claim 1, wherein performing channel coding on the uplink control signaling comprises:
when a bit number of the uplink control signaling is greater than 11 bits, performing coding using a tail biting convolution code with constraint length of 7 and code rate of 1/3; and
performing coding using a linear block code when the bit number is no greater than 11 bits.

3. The method according to claim 1, wherein performing scrambling on the uplink control signaling comprises:
adding a scrambling sequence to a sequence of the coded uplink control signaling, and performing an operation of mod 2 to obtain a scrambled sequence; wherein the scrambling sequence is formed by a pseudorandom sequence.

4. The method according to claim 1, wherein performing modulation on the uplink control signaling comprises:
modulating a sequence of the scrambled uplink control signaling by adopting a Quadrature Phase Shift Keying (QPSK) modulation mode.

5. The method according to claim 1, wherein performing time-domain spreading on the uplink control signaling comprises:
spreading a sequence of the processed uplink control signaling to an OFDM symbol used for bearing the uplink control signaling using an orthogonal sequence;
wherein the orthogonal sequence is a Discrete Fourier Transform (DFT) sequence, or a Walsh sequence, or a Const Amplitude Zero Auto Correlation (CAZAC) sequence, or a spreading sequence of the DFT sequence, or a spreading sequence of the Walsh sequence, or a spreading sequence of the CAZAC sequence; and
wherein a length of the orthogonal sequence is equal to a number of OFDM symbols used for bearing the uplink control signaling in one slot.

6. The method according to claim 1, wherein performing precoding transform on the uplink control signaling comprises:
performing a DFT operation on a sequence of the uplink control signaling in the OFDM symbol used for bearing the uplink control signaling.

7. The method according to claim 1, wherein the OFDM symbol used for bearing the uplink control signaling is OFDM symbols in a sub-frame other than an OFDM symbol occupied by an uplink reference signal.

8. The method according to claim 7, wherein:
when the uplink control signaling and an uplink Sounding Reference Signal (SRS) are borne in one sub-frame, neither the uplink control signaling nor an uplink demodulation reference signal is borne in a last OFDM symbol in a second slot of the sub-frame.

9. The method according to claim 1, wherein bearing the demodulation reference signal in k OFDM symbols in each slot comprises:
in the sub-frame with the extended cyclic prefix, bearing one demodulation reference signal in a second OFDM symbol or a third OFDM symbol in each slot;
wherein the OFDM symbols in each slot are numbered starting from 0.

10. The method according to claim 1, wherein when two or more OFDM symbols are occupied by the uplink demodulation reference signal, the demodulation reference signal borne in each OFDM symbol is of a same sequence or a sequence subjected to time-domain spreading, wherein the sequence is a Computer-generated-Const Amplitude Zero Auto Correlation (CG-CAZAC).

11. A terminal, comprising:
a memory storing programming instructions; and
a processor configured to be capable of executing the stored programming instructions to perform steps comprising:
a) preprocessing uplink control signaling which is an Acknowledged/Non-Acknowledged (ACK/NACK) message supporting more than 4 bits;
  ai) successively performing, on the uplink control signaling, channel coding, scrambling, modulation, time-domain spreading and precoding transform, wherein when two slots in a sub-frame bear same information, a length of the coded uplink control signaling is 12×Qm, wherein Qm is a corresponding modulation order;
  or
  aii) successively performing, on the uplink control signaling, channel coding, scrambling, modulation, precoding transform and time-domain spreading, wherein when two slots in a sub-frame bear same information, a length of the coded uplink control signaling is 12×Qm, wherein Qm is a corresponding modulation order;
b) mapping the preprocessed uplink control signaling to an Orthogonal Frequency Division Multiplexing (OFDM) symbol used for bearing the uplink control signaling;
c) transmitting the uplink control signaling; and
d) bearing an uplink demodulation reference signal in k OFDM symbols in each slot, wherein
  di) when the k OFDM symbols in the sub-frame have an extended cyclic prefix, k=1;
  or
  dii) when the k OFDM symbols in the sub-frame have an normal cyclic prefix, k=2.

12. The terminal according to claim 11, the processor configured to be capable of executing the stored programming instructions to perform steps further comprising adding a scrambling sequence to a sequence of the coded uplink control signaling, and then perform an operation of mod 2 to obtain a scrambled sequence, wherein the scrambling sequence is formed by a pseudorandom sequence.

13. The terminal according to claim 11, the processor configured to be capable of executing the stored programming instructions to perform steps further comprising modulating the scrambled uplink control signaling by adopting a Quadrature Phase Shift Keying (QPSK) modulation mode.

14. The terminal according to claim 11, the processor configured to be capable of executing the stored programming instructions to perform steps further comprising spreading a sequence of the processed uplink control signaling to an OFDM symbol used for bearing the uplink control signaling using an orthogonal sequence;
  wherein the orthogonal sequence is a DFT sequence, or a Walsh sequence, or a CAZAC sequence, or a spreading sequence of the DFT sequence, or a spreading sequence of the Walsh sequence, or a spreading sequence of the CAZAC sequence; and
  wherein a length of the orthogonal sequence is equal to a number of OFDM symbols used for bearing the uplink control signaling in one slot.

15. The terminal according to claim 11, the processor configured to be capable of executing the stored programming instructions to perform steps further comprising performing a DFT operation on a sequence of the uplink control signaling in the OFDM symbol used for bearing the uplink control signaling.

16. The terminal according to claim 11, wherein the OFDM symbol used for bearing the uplink control signaling is OFDM symbols in a sub-frame other than an OFDM symbol occupied by an uplink reference signal.

17. The terminal according to claim 16,
  the processor configured to be capable of executing the stored programming instructions to perform steps further comprising when the uplink control signaling and an Sounding Reference Signal (SRS) are borne in one sub-frame, bearing neither the uplink control signaling nor an uplink demodulation reference signal in a last OFDM symbol in a second slot of the sub-frame.

18. The terminal according to claim 11,
  the processor configured to be capable of executing the stored programming instructions to perform steps further comprising: in the sub-frame with the extended cyclic prefix, bearing one demodulation reference signal in a second OFDM symbol or a third OFDM symbol in each slot;
  wherein the OFDM symbols in each slot are numbered starting from 0.

19. The terminal according to claim 11, wherein when the two or more OFDM symbols are occupied by the uplink demodulation reference signal, the demodulation reference signal borne in each OFDM symbol is of a same sequence, or a sequence subjected to time-domain spreading, wherein the sequence is a Computer-generated-Const Amplitude Zero Auto Correlation (CG-CAZAC) sequence.

20. The terminal according to claim 11,
  the processor configured to be capable of executing the stored programming instructions to perform steps further comprising:
  performing coding using a tail biting convolution code with constraint length of 7 and code rate of 1/3, when a bit number of the uplink control signaling is greater than 11 bits; and
  performing coding using a linear block code when the bit number is no greater than 11 bits.

21. The terminal according to claim 11, the processor configured to be capable of executing the stored programming instructions to perform steps further comprising adding a scrambling sequence to a sequence of the coded uplink control signaling, and then perform an operation of mod 2 to obtain a scrambled sequence, wherein the scrambling sequence is formed by a pseudorandom sequence.

22. The terminal according to claim 11, the processor configured to be capable of executing the stored programming instructions to perform steps further comprising modulating the scrambled uplink control signaling by adopting a Quadrature Phase Shift Keying (QPSK) modulation mode.

23. The terminal according to claim 11, the processor configured to be capable of executing the stored programming instructions to perform steps further comprising spreading a sequence of the processed uplink control signaling to an OFDM symbol used for bearing the uplink control signaling using an orthogonal sequence;
  wherein the orthogonal sequence is a DFT sequence, or a Walsh sequence, or a CAZAC sequence, or a spreading sequence of the DFT sequence, or a spreading sequence of the Walsh sequence, or a spreading sequence of the CAZAC sequence; and
  wherein a length of the orthogonal sequence is equal to a number of OFDM symbols used for bearing the uplink control signaling in one slot.

24. The terminal according to claim 11, the processor configured to be capable of executing the stored programming instructions to perform steps further comprising performing a DFT operation on a sequence of the uplink control signaling in the OFDM symbol used for bearing the uplink control signaling.

* * * * *